US008228952B2

(12) United States Patent
Pollin et al.

(10) Patent No.: US 8,228,952 B2
(45) Date of Patent: Jul. 24, 2012

(54) METHOD FOR OPERATING A TELECOM SYSTEM

(75) Inventors: Sofie Pollin, Oostkamp (BE); Bruno Bougard, Carnieres (BE); Gregory Lenoir, Nivelles (BE); Francky Catthoor, Temse (BE)

(73) Assignee: IMEC, Leuven (BE)

( * ) Notice: Subject to any disclaimer, the term of this patent is extended or adjusted under 35 U.S.C. 154(b) by 720 days.

(21) Appl. No.: 10/922,371

(22) Filed: Aug. 20, 2004

(65) Prior Publication Data

US 2005/0152280 A1 Jul. 14, 2005

(30) Foreign Application Priority Data

Aug. 22, 2003 (GB) .................................. 0319795.1
Jul. 9, 2004 (EP) .................................. 04447170

(51) Int. Cl.
 *H04J 3/00* (2006.01)
(52) U.S. Cl. ...................................................... 370/498
(58) Field of Classification Search .................. 370/503,
 370/498; 455/461; 379/40, 49, 270.02; 709/201,
 709/223; 719/316
 See application file for complete search history.

(56) References Cited

U.S. PATENT DOCUMENTS

| 6,424,657 | B1 | 7/2002 | Voit et al. |
| 6,492,283 | B2 | 12/2002 | Raaijmakers et al. |
| 6,724,727 | B2 | 4/2004 | Counterman |
| 6,751,297 | B2* | 6/2004 | Nelkenbaum ............... 379/88.13 |
| 6,794,314 | B2 | 9/2004 | Raaijmakers et al. |
| 6,871,011 | B1 | 3/2005 | Rahman et al. |
| 6,934,530 | B2* | 8/2005 | Engelhart ..................... 455/406 |
| 6,978,306 | B2 | 12/2005 | Miller et al. |
| 7,010,037 | B2* | 3/2006 | Ye et al. ....................... 375/240.1 |
| 7,010,790 | B2* | 3/2006 | Marsot et al. ................. 718/105 |
| 7,133,457 | B2* | 11/2006 | Singh et al. .................... 375/260 |
| 7,190,676 | B2* | 3/2007 | Anderson, Sr. ............... 370/236 |
| 7,248,894 | B2* | 7/2007 | Fujieda et al. ................ 455/557 |
| 7,269,226 | B2* | 9/2007 | Sipila ............................ 375/262 |
| 7,277,458 | B2 | 10/2007 | Cho et al. |
| 7,295,563 | B2* | 11/2007 | Hughes ......................... 370/412 |
| 7,298,736 | B1* | 11/2007 | Matthews ..................... 370/356 |
| 7,310,678 | B2* | 12/2007 | Gunaseelan et al. .......... 709/230 |
| 7,313,627 | B1* | 12/2007 | Noble ........................... 709/233 |
| 7,319,670 | B2* | 1/2008 | Walls et al. ................... 370/236 |
| 7,496,138 | B2 | 2/2009 | Pietraski et al. |
| 7,646,802 | B2 | 1/2010 | Black et al. |
| 2002/0119799 | A1 | 8/2002 | Moulsley et al. |

OTHER PUBLICATIONS

Berry, Randall A., "Optimal power-delay trade-offs in fading channels—small delay asymptotics", International Symposium on Information Theory, 2003 & 2004.
Choi, et al., "TCP Performance Analysis in Wireless Transmission using AMC" *IEEE VTC* (Spring 2003) 611-615.

(Continued)

*Primary Examiner* — Chandrahas Patel
(74) *Attorney, Agent, or Firm* — Knobbe Martens Olson & Bear LLP

(57) ABSTRACT

Disclosed is a method for managing the operation of a telecom system, and minimizing the energy to be drained from a power supply. According to the method, a rate constraint and telecom environment conditions are determined. Then, a working point is selected a plurality of predetermined working points based on the rate constraint and the telecom environment conditions. The telecom system is operated at the selected working point by setting corresponding control parameters.

51 Claims, 22 Drawing Sheets

OTHER PUBLICATIONS

Denolf, K., et al., "Cost-efficient C-level design of an MPEG-4 video decoder", *Proceedings of the IEEE Workshop on Power and Timing Modeling, Optimization and Simulation*, Goettingen, Germany, Sep. 2000, pp. 233-242.

De Vleeschouwer, C., and Nilsson, T., "Motion estimation for low power video devices", *Proceedings of the IEEE International Conference on Image Processing (ICIP01)*, Thessaloniki, Greece, Oct. 2001, pp. 953-956.

Dufaux, et al., Motion JPEG2000 for Wireless Applications, Proc. of First International JPEG2000 Workshop, 2003, Lugano, Switzerland.

Goldsmith, Andrea J., "The Capacity of Downlink Fading Channels with Variable Rate and Power" *IEEE Transactions on Vehicular Technology* (1997) 46(3): 569-580.

IEEE 802.11-2007 IEEE Standard for Information technology—Telecommunications and information exchange between systems—Local and metropolitan area networks—Specific requirements—Part 11: Wireless LAN Medium Access Control (MAC) and Physical Layer (PHY) Specifications.

IEEE Std 802.11e-2005 IEEE Standard for Information technology—Telecommunications and information exchange between systems—Local and metropolitan area networks—Specific requirements—Part 11: Wireless LAN Medium Access Control (MAC) and Physical Layer (PHY) Specifications, Amendment 8: Medium Access Control (MAC) Quality of Service Enhancements.

Kompella, R. and Snoeren, A.C., "Practical Lazy Scheduling in Sensor Networks" *Proc ACM Sensor Networks Conf.*, Los Angeles, Nov. 2003.

Li, et al., Providing Adaptive QoS to Layered Video Over Wireless Local Area Networks Through Real-Time Retry Limit Adaptation. 2004, *IEEE Trans. on Multimedia*, 6(2):278-290.

Qiao, et al., "Energy-efficient PCF operation of IEEE 802.11a WLANs via transmit power control" *Computer Networks* (2003) 42: 39-54.

Qiao, et al., MiSer: an optimal low-energy transmission strategy for IEEE 802.11a/h. In *Proceedings of the 9th Annual international Conference on Mobile Computing and Networking* (San Diego, CA, USA, Sep. 14-19, 2003). MobiCom '03. ACM, New York, NY, 161-175.

Schurgers, Curt, "Energy-Aware Wireless Communications", Ph.D. Dissertation, University of California Los Anglese, Los Angeles, CA, 2002.

Sinha, et al., "Energy Scalable System Design" *IEEE Transactions on Very Large Scale Integration (VLSI) Systems* (Apr. 2002) 10(2): 135-145.

Uysal-Biyikoglu, Elif, "Adaptive Transmission for Energy Efficiency in Wireless Data Networks", Ph.D. Dissertation, Stanford University, Palo Alto, CA, Jun. 2003.

Uysal-Biyikoglu, et al., Energy-Efficient Packet Transmission Over a Wireless Link. *ACM/IEEE Transactions on Networking*, 2002, 10(4):487-499.

Wang, et al., "Video Quality Assessment Based on Structural Distortion Measurement" *Signal Processing: Image Communication* (Jan. 2004) 19(1): 1-4.

Ye, W., et al., An Energy-Efficient Mac Protocol for Wireless Sensor Networks. IEEE INFOCOM 2002.

Zou, et al., "The effects of Adaptive Modulation on the TCP Performance", *Communications, Circuits and Systems and West Sino Expositions* (2002) 262-266.

Office Action for corresponding U.S. Appl. No. 11/697,669 dated Feb. 1, 2010.

Office Action for corresponding U.S. Appl. No. 11/247,403 dated Feb. 19, 2010.

Office Action dated Jun. 25, 2008 in corresponding U.S. Appl. No. 11/247,403, filed Oct. 11, 2005.

Office Action dated Jan. 26, 2009 in corresponding U.S. Appl. No. 11/247,403, filed Oct. 11, 2005.

Office Action dated Aug. 13, 2009 in corresponding U.S. Appl. No. 11/247,403, filed Oct. 11, 2005.

Office Action dated Aug. 17, 2010 in corresponding U.S. Appl. No. 11/247,403, filed Oct. 11, 2005.

Office Action dated Aug. 7, 2009 in corresponding U.S. Appl. No. 11/697,669, filed Apr. 6, 2007.

Office Action dated Feb. 1, 2010 in corresponding U.S. Appl. No. 11/697,669, filed Apr. 6, 2007.

Office Action dated Sep. 30, 2010 in corresponding U.S. Appl. No. 11/697,669, filed Apr. 6, 2007.

Office Action dated May 26, 2011 in corresponding U.S. Appl. No. 11/697,669, filed Apr. 6, 2007.

Office Action dated Dec. 16, 2009 in corresponding U.S. Appl. No. 11/944,324, filed Nov. 21, 2007.

Office Action dated Jul. 26, 2010 in corresponding U.S. Appl. No. 11/944,324, filed Nov. 21, 2007.

Li, et al. Quality-Energy Scalable Chip level Equalization for HSDPA, IEEE Globecom 2006, IEEE 2006 6 pages.

Prabhakar, et al. "Energy-efficient Transmission over a Wireless Link via Lazy packet Scheduling"; IEEE Infocom 2001. vol. 1, Apr. 22, 2001, pp. 386-395.

\* cited by examiner

METHOD FOR OPERATING A TELECOM SYSTEM

BACKGROUND OF THE INVENTION

1. Field of the Invention

The present invention is related to a method for operating a telecom system, more in particular a wireless system, and devices suited therefor.

2. Discussion of Related Technology

By discussion of technologies and references in this section, Applicants do not admit that the references are prior art of the invention disclosed in this application.

The current demand in increasing data rate and quality of service in advanced wireless communications has to cope with an energy budget severely constrained by autonomy and ubiquity requirements. Trading off performance and energy consumption deserves the highest attention to enable the 'anything, anywhere, anytime' paradigm.

The following observations show the need to integrate the energy-efficient approaches across layers. First, state-of-the-art wireless systems devices are built to operate at only a fixed set of operating points and assume the worst-case conditions at all times. Irrespective of the link utilization, the highest feasible PHY rate is always used and the power amplifier operates at the maximum transmit power. Indeed, when using non-scalable transceivers, this highest feasible rate results in the smallest duty cycle for the power amplifier. Compared to scalable systems, this results in excessive energy consumption for average channel conditions and average link utilizations. However, recent energy-efficient wireless system designs focus on energy-efficient VLSI implementations and adaptive physical layer algorithms to adjust the modulation, code rate or transmission power. For these schemes to be practical, they need to be aware of the instantaneous user requirements.

Further, to realize sizeable energy savings, systems need to shutdown the components when inactive. This is achieved only by tightly coupling the MAC to be able to communicate traffic requirements of a single user and schedule shutdown intervals.

In the case of a multi-user wireless communication system, there exist complex trade-offs between the adaptive physical layer schemes and the requirements of multiple users. For example, lowering the rate of one user affects the available time for the second delay sensitive user. This forces the second user to increase its rate, consume more energy and potentially suffer from a higher bit error rate.

However, the traditional approaches, including most of the state-of-the-art cross-layer optimization frameworks, do not yet enable a meaningful trade-off between performance and energy consumption. Indeed, most of them solve problems in an ad hoc way, focusing on the interaction between adjacent layers and do not raise the scope to the user level. Indeed, the real performance metrics are those quantifying the quality of the service provided by the complete communication stack to the application, while the only effective energy consciousness indicator is the actual energy that is drained from the battery. Both depend jointly on the propagation aspects, the physical layer, the complete protocol stack, the application itself and, more problematically, also on their implementation aspects. This spans far more than the scope of traditional system optimization approaches. Furthermore, the traditional 'optimization paradigm' itself, namely finding a unique optimal communication system configuration representing the best trade-off between performance and cost, becomes inappropriate when the dynamics in the wireless environment and user requirements are considered. More specifically, because of this dynamics, no unique optimal working point exists. The ultimate energy-efficient system would have to adapt permanently its characteristic, given the environment constraints, to provide the performance exactly required by the user with the minimum energy.

To achieve this goal flexible systems must be specified having so-called configuration knobs that can be set at run-time to steer jointly the performance and energy consumption. The higher the flexibility, i.e. the number of configuration knobs across all layers, the higher the potential gain due to a better match between the system behavior, the environment and the real user requirements. However, a penalty exists due to the required shift, at least partially, of the optimization process to run-time. This is very challenging due to the combinatorial character of the problem (the number of candidate configurations rises exponentially with the number of controlled knobs).

Recently, joint transmission power and rate control has been considered to reduce system power (see D. Qiao et al., '*Energy Efficient PCF Operation of IEEE802.11a WLAN with Transmit Power control*', Elsevier Computer Networks (ComNet), vol. 42, no. 1, pp. 39-54, May 2003 and '*MiSer: An Optimal Low-Energy transmission Strategy for IEEE 802.11a/h*', Proc. ACM MobiCom '03, San Diego, September 2003). This approach can be seen as the application to wireless system design of the 'power aware' design paradigm proposed by Sinha et al. ('*Energy Scalable System Design*', Trans. on VLSI Systems, April 2002, pp. 135-145). Given the fact that transmitting at a lower rate requires less power, the 'lazy scheduling' principle has been proposed (see '*Adaptive Transmission for Energy Efficiency in Wireless Data Networks*', E. Uysal-Biyikoglu, Ph.D. Thesis, Stanford, June 2003): based on a look-ahead of the link utilization (i.e. packet arrival at the transmitter), the minimum average rate to satisfy the current traffic requirements is considered and transmit rate and power are set in function of the channel state in order to achieve this average during the next look-ahead window.

In '*Energy-aware Wireless Communications*' (C. Schurgers, Ph.D. thesis, University of California, Los Angeles, 2002) the concept of energy-aware radio-management is developed. It proposes simple models to capture the energy consumption of radio systems that are used to derive some energy-efficient algorithms to select the modulation order, the code rate and to schedule the packets. This dynamic modulation and code scaling is proposed as a practical way to implement lazy scheduling. It also discusses the energy trade-off between transmission rates and shutting off the system. Operating regions are derived when a transceiver may sleep or use transmission scaling for time-invariant and time-varying channels. However, the general solutions to transparently exploit the energy-performance scalability at run-time are limited to a few (2-3) system level knobs. The energy-scalability of a system can be defined as the range in which the energy consumption can vary when the performance requirements—e.g. the user data rate—or the external constraints—e.g. the propagation conditions—vary from worst to best case.

In '*Practical Lazy Scheduling in Sensor Networks*', R. Rao et al, Proc ACM Sensor Networks Conf, Los Angeles, November 2003 a CSMA/CA MAC protocol based on the lazy scheduling idea is derived.

From a theoretical point of view, the 'lazy scheduling' concept is attractive. E.g. radio link control based on 'lazy scheduling' looks to be a promising technique for WLAN power management. However, it has been analyzed exclusively from the viewpoint of physical, MAC and dynamic link control (DLC) layer. Yet, effective power management in radio communication requires considering the complete protocol stack and its cross-layer interactions.

SUMMARY OF THE INVENTION

The present invention provides a method for operating a telecom system, more in particular a wireless system, with a globally optimized power consumption for a given quality of service. The invention further aims to provide devices suited therefore.

The present invention relates to a method for managing the operation of a telecom system and minimizing the energy to be drained from a power supply, comprising the steps of: determining a rate constraint; determining the telecom environment conditions; selecting a working point by solving an optimization problem, taking into account the rate constraint and the telecom environment conditions, and given a plurality of predetermined working points for a discrete set of telecom environment conditions; and operating the telecom system at the selected working point by setting corresponding control parameters. Setting control parameters implies imposing said control parameters on the telecom system.

The telecom system is preferably a wireless telecom system. In an advantageous embodiment the telecom system is a single telecom device. Alternatively, the telecom system is a plurality of telecom devices. The operating step then includes setting each of the telecom devices at a selected working point by setting corresponding control parameters.

In a preferred embodiment the rate constraint is a varying rate constraint. The rate constraint is preferably a constraint on the average rate.

Typically the telecom environment conditions include channel state. Advantageously the discrete set of telecom environment conditions is organized per channel state.

In another preferred embodiment the step of selecting a working point, includes selecting the plurality of predetermined working points corresponding to the determined telecom environment conditions.

In a preferred embodiment, before the step of selecting, the step is performed of determining the plurality of predetermined working points. Also, before the step of selecting, the step may be performed of loading the plurality of predetermined working points. Preferably, after the step of loading the step is performed of adapting the plurality of predetermined working points. The predetermined set of working points typically includes at least sleep mode and working mode of the telecom device. In a specific embodiment the plurality of predetermined working points define a monotonous, non-convex curve.

The telecom environment conditions preferably comprise path loss and/or channel frequency selectivity.

In yet another embodiment the control parameters comprise parameters controlling modulation order and/or code rate and/or transmit power and/or packet size.

Advantageously for each of the channel states performance-energy trade-off curves are derived. In an advantageous embodiment the performance-energy trade-off curves are Pareto-optimal curves. Specifically the energy-per-bit is used as energy metric. The net throughput may be used as performance metric. Alternatively the sum of the energy consumption of the telecom devices is used as energy metric.

In a further embodiment the telecom environment conditions further comprise current traffic requirements, whereby the current traffic requirements are taken into account in determining the rate constraint.

In a further embodiment said step of selecting a working point includes solving a scheduling problem, preferably said scheduling involves scheduling transmission of packets between said telecom devices, said scheduling taking into account dependencies between said packets.

The invention also relates to a method for managing the operation of a telecom system comprising a queuing mechanism introducing a queuing delay, whereby the method minimizes the energy to be drained from a power supply, comprising the steps of: determining telecom environment conditions, including current traffic requirements, determining an average rate constraint to meet the current traffic requirements, by solving an optimization problem, setting at least one control parameter, the control parameter taking in account the instantaneous queuing delay, operating the telecom system by setting the control parameter taking in account the instantaneous queuing delay.

Preferably the average rate constraint is set as a parameterizable function of the number of bits in the queue of said queuing mechanism, the parameters being control parameters. Advantageously the step of determining the average rate constraint is based on a look-ahead with variable window size of the link utilization, whereby the window size is determined by the control parameter. In a specific embodiment the telecom device is further provided with a packet retransmission mechanism and whereby the optimization problem optimizes the end-to-end throughput.

Another aspect of the invention relates to a device operating according to the method as previously described, comprising storage means for storing the performance/energy trade-off curves.

In a preferred embodiment the device further comprises computation means for solving the optimization problem. Advantageously, the computation means further determine or adapt the predetermined working points.

In a further aspect the invention relates to a computer program, stored on a computer readable medium, comprising instructions, which when executed on a computer, executed the methods as previously described.

DETAILED DESCRIPTION OF EMBODIMENTS OF THE INVENTION

The following detailed description will explain various features of the invention in detail. The invention can be embodied in numerous ways as defined and covered by the claims. In order to clarify certain parts of this description some concepts will be illustrated with the practical example of an OFDM-based WLAN system.

To illustrate certain elements of the solution according to the invention, the energy-scalability of OFDM-based WLAN such as proposed by the 802.11a/g standards will be considered as an example. Currently proposed techniques to exploit the energy-performance trade-off in wireless links mainly rely on the reduction of the transmit-power. However, when considering the energy consumption breakdown of practical IEEE 802.11a WLAN transceivers (FIG. 1), it appears that the transmit-power itself accounts only for 8% of the total energy consumption of the transmitter. The Power Amplifier (PA) dominates with 49%. Moreover, due to the stringent linearity and spectral mask requirements of the OFDM modulation, class A power amplifiers are most often required. Consequently, the actual energy consumption of the PA is invariant with the transmit power. On the other hand, traditional receiver architectures are dimensioned for the most demanding modulation and present constant processing gain. Therefore, only the duty cycle effectively affects the link energy consumption. In that context, the highest modulation order that goes through the channel with reasonable packet error rate (i.e. 1%) is always the best choice. Performance (i.e. net data rate) downscaling does not bring effective energy consumption reduction.

In order to get effective energy consumption benefit from energy-aware link adaptation technique, the energy consumption scalability of OFDM-based WLAN transceivers has to be enhanced. The following enhancements are proposed: A. configurable power amplifier saturation point; and B. configurable receiver processing gain.

A. Configurable Power Amplifier Saturation Point

Figure 2A:
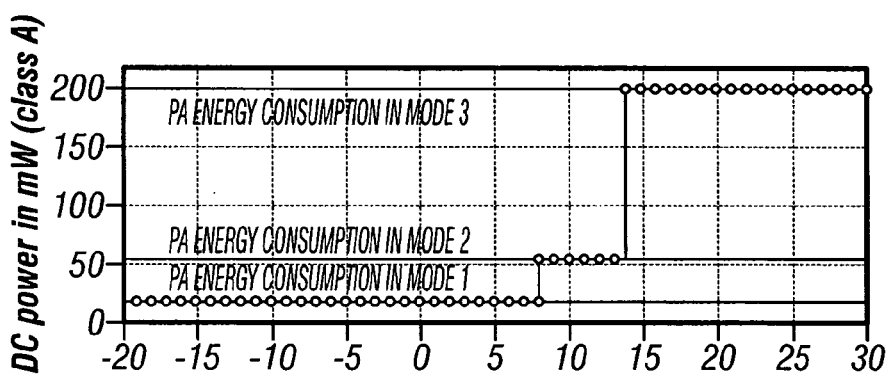
FIG. 2A represents DC power consumption of a Class A power amplifier (PA).
Figure 2B:
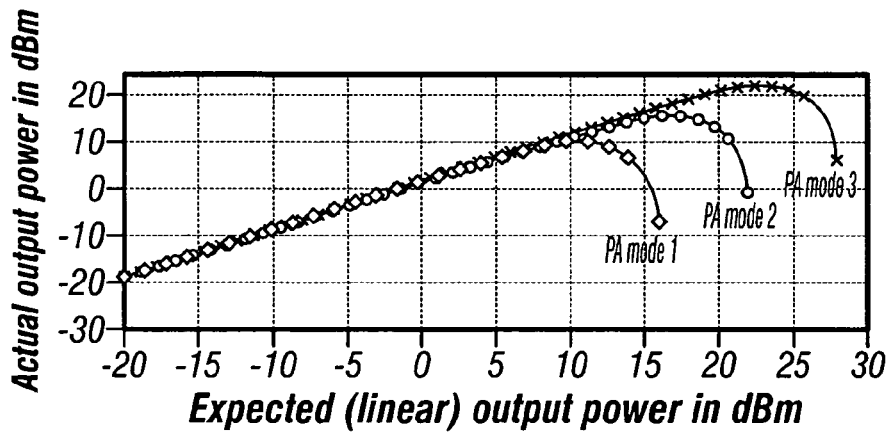
FIG. 2B represents adaptation of the PA gain compression characteristic.

The transmitter energy-consumption is dominated by the power amplifier contribution. The idea is to allow adapting the gain compression characteristic of the power amplifier together with its working point on this characteristic. Typical WLAN power amplifiers operate with class A amplifiers that have a fixed gain compression characteristic, so that it is impossible to reduce simultaneously the output power and the linearity, e.g. to adapt to the lower requirement of lower order sub-carrier modulations, as illustrated in FIG. 2B. Reducing the output power translates into an increased back-off, and therefore into an higher linearity and a decreased power efficiency. This kills the benefit in terms of total power consumption. Therefore, it makes sense to vary independently the average transmit power and the back-off, which requires to adapt the gain compression characteristic (FIG. 2A). This can be done for instance by applying dynamic voltage scaling.

B. Configurable Receiver Processing Gain

Figure 1:
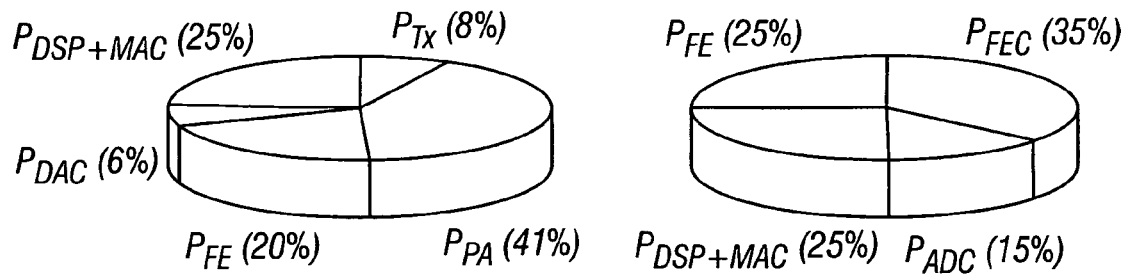
FIG. 1 represents the energy consumption breakdown in typical wireless transceivers.

For the receiver, it appears that the energy consumption is dominated by the digital signal processing in which the forward error correction accounts for an important part (FIG. 1). Scalability in receiving energy consumption can be achieved by trading off processing gain (and consequently, receiver sensitivity) and computing energy by activating more or less digital signal processing. This can be achieved for instance by adopting iterative forward error correction (FEC) schemes like turbo-codes. Turbo-codes can be implemented with low energy consumption and provide a wide freedom to trade-off energy consumption versus code gain, which translates in receiving processing gain.

The impact of the energy-scalability enhancement techniques is now further analyzed. The optimal trade-off between the net data rate on top of the data-link layer (goodput) and the total link energy consumption is derived by exploring the settings of the traditional link parameters:

modulation, code rate, output power, packet size next to the new functional parameters introduced, namely the power amplifier saturation power relative to the output power (back-off) and the number of decoding iterations. Table 1 summarizes the system level control knobs used to bring energy-scalability and their range.

TABLE 1

| | |
|---|---|
| PA transmit Power ($P_{Tx}$) | 0 to 20 dBm by step of 2 dBm |
| PA back off (b) | 6 to 16 dB by step of 1 dB |
| Packet (data) size ($L_p$) | 50, 100, 500, 1000, 1500 bytes |
| Code rate ($R_c$) | ½, ⅔, ¾ |
| Modulation order ($N_{mod}$) | 1, 2, 4, 6 |
| Number of turbo-iterations (I) | 3 to 6 |

To be able to explore the energy-scalability of extended WLAN transceivers, robust performance and energy models are developed, which also consider the specificity of the indoor propagation channel. The models are incorporated in a simulation framework that allows generating very quickly performance-energy trade-off curves in realistic user scenarios, e.g. Pareto curves. These models are now discussed more in detail.

Tracking analytically the dependencies between the link parameters (system level knobs), the environment constraints (here the path loss and the channel frequency selectivity), the energy consumption and the performance (data rate) is difficult when the complete system is considered (i.e. not only the physical layer). Performance and energy consumption are non-linearly coupled e.g. by the automatic repeat request (ARQ) mechanism. To capture accurately those effects, system profiling using event-driven protocol simulation is most appropriate. Yet, the protocol simulator requires information about the radio-link, i.e. the packet error rate (PER), the gross data rate and the transmission energy per packet, which is also dependent on the system level knobs and the environment constraints.

Figure 3:
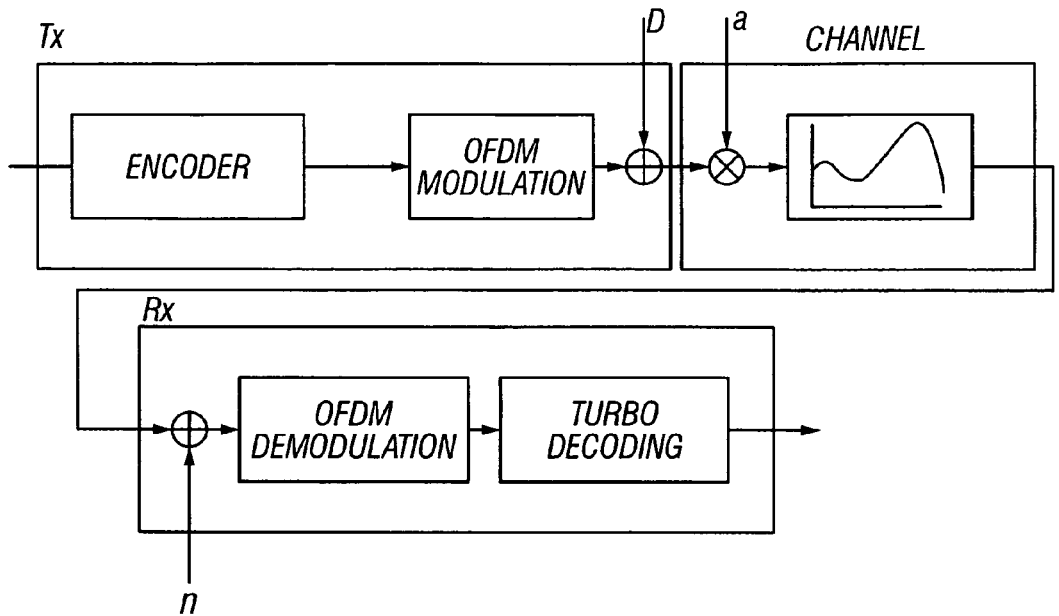
FIG. 3 represents the physical layer simulation chain used to derive the PER performance model.

At the physical layer level performance and energy models can be decoupled. An end-to-end simulation chain (FIG. 3) implementing the energy-scalability enhancement techniques as described before is used to identify the physical layer PER performance as a function of the system level knobs. First the data is encoded by a turbo-encoder. Then, the bit stream is modulated using OFDM according to the IEEE 802.11a standard. When transmitted, the signal is hampered by the non-linearity of the power amplifier. This effect is captured considering an additive distortion power, the distortion being assimilated to a noise source (D). The transmitter output signal-to-noise and distortion ratio (SINAD) is related to the back-off according to a law obtained by measurements. Next, the signal passes through the channel. The effect of the wireless indoor channel is decoupled in two effects: first, an average path loss assumed constant (a(d)); secondly, the multi-path fading that leads to a time-varying frequency selective channel response. To model the noise introduced by the receiver, a white Gaussian noise (n) is added. Finally, the signal is demodulated and decoded. The Packet error rate (PER) can be evaluated with Monte-Carlo simulations. However, it is better to assess the code block error rate (BIER), which is independent of the packet size. The PER can be directly derived from the BIER when knowing the packet size.

Figure 4A:
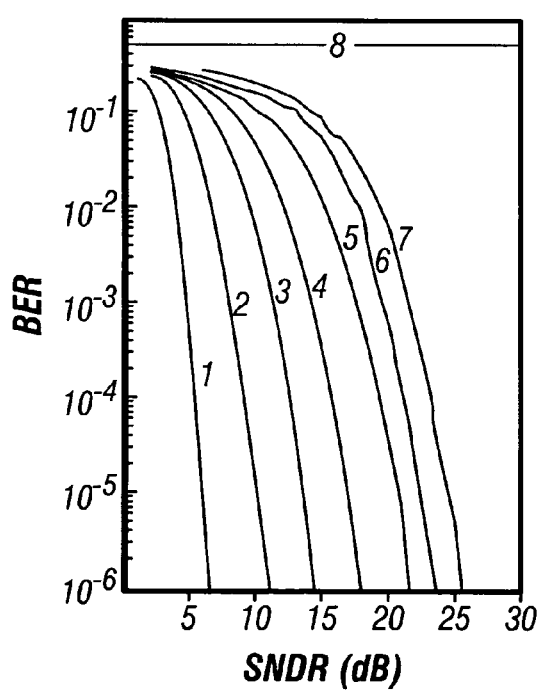
FIG. 4A represents block error rate performance of 8 states of the fading channel realizations.
Figure 4B:
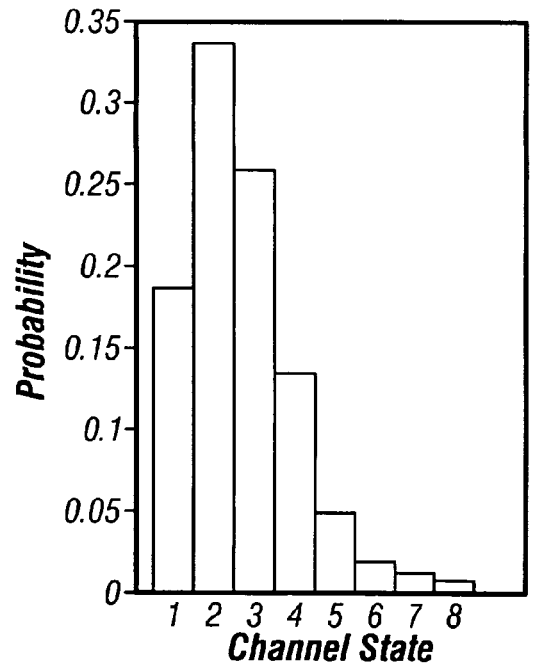
FIG. 4B is a histogram of the state probabilities of the 8 states of the fading channel realizations.
Figure 5A:
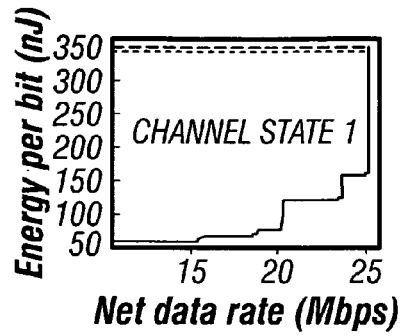
FIGS. 5A-5G are the optimal energy performance trade-off curves for a 802.11a WLAN link at 10 m, for standard transceivers (dashed line) and energy-scalable transceiver (plain line).
Figure 5B:
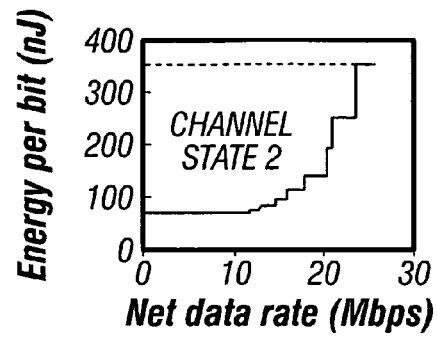
Figure 5C:
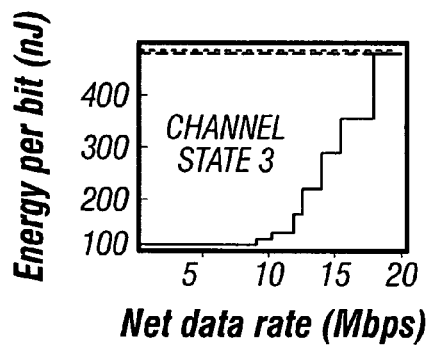
Figure 5D:
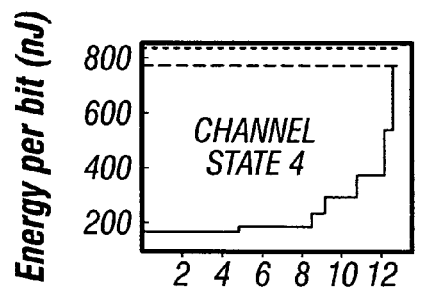
Figure 5E:
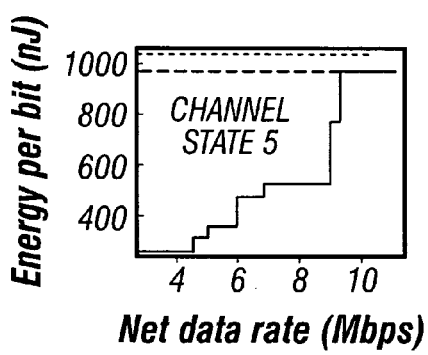
Figure 5F:
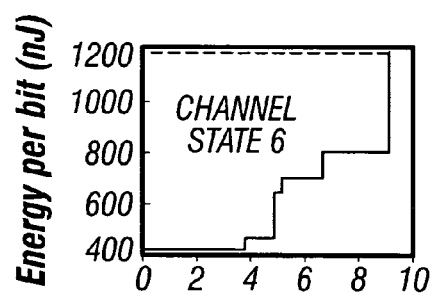
Figure 5G:
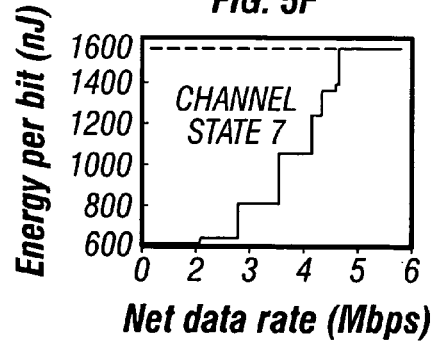

Simulation results depict a large variation in performance depending on the channel realisation, even when the average path loss is constant. By performing Monte-Carlo simulations over a large amount of channel realizations, a classification has been made (FIGS. 4A and 4B). Channel responses leading to similar BIER for the same SINAD have been grouped in representative classes corresponding to so-called channel states. It turns out that 8 classes are sufficient to cover the range with representative average BIER vs. SINAD curves. FIG. 4A depicts the block error rate performance curves for the first 7 states considered. The histogram of the state probabilities is depicted in FIG. 4B. The separation between two adjacent channel classes is set to 2 dB, which corresponds to the granularity with which it is assumed the transmit power can be tuned. No transmission is assumed to be possible in the $8^{th}$ channel state, which occurs with a probability of less that 0.5%. With such a model, the energy-performance trade-off can be analyzed independently for each channel state, which again reduces the exploration complexity.

Next to the performance model, an energy model for the wireless link has to be established. The energy to transmit and to receive one packet is given as a function of the system level knobs (Table 2).

For the transmitter, the energy per packet is assumed equal to the product of the radio power by the time needed to transmit the packet ($T_{up}$), plus the energy consumed by the digital processing to format it, which is proportional to the packet size. EDSP denotes the DSP energy consumed per transmitted bit. The radio power is the sum of the PA power ($P_{PA}$) and radio front-end power ($P^T_{FE}$). The PA power ($P_{PA}$) is equal to the transmit power ($P_{Tx}$) divided by the PA power efficiency (η), which is expressed as a function of the back-off b by the measured relation η(b). This relation has been obtained by fitting to measurement results. The contribution of the transmit front-end ($P^T_{FE}$) is assumed to be constant. The time to transmit a packet ($T_{up}$) can be computed as the ratio of the packet size ($L_p$) by the physical layer data rate, which is the product of the modulation order ($N_{mod}$), the number of data carriers in the OFDM symbol ($N_c$), the code rate ($R_c$) and the OFDM symbol rate, or baud rate ($R_s$).

TABLE 2

| Performance model | | | Energy model | | |
|---|---|---|---|---|---|
| Model Parameters | | | | | |
| $L_b$ | Turbo Code Block size (bit) | 288 | $P^T_{FE}$ | Transmit front-end power (W) | 200 |
| W | Bandwidth (MHz) | 20 | $P^R_{FE}$ | Receive front-end power (W) | 200 |
| T | Temperature (Celsius) | 25 | $E^R_{DSP}$ | Receive DSP energy (nJ/bit) | 7.5 |
| NF | Receiver Noise Figure (dB) (Including Implemtation loss) | 15 | $E^T_{DSP}$ | Transmit DSP energy (nJ/bit) | 8.8 |
| | | | $R_s$ | Baud Rate (kbaud) | 250 |
| d | Distance Transmitter -Receiver (m) | 10 | $N_c$ | Number of data carrier per OFDM symbols | 48 |
| Relations | | | | | |
| A(d) | Channel attenuation | Front average propagation loss model | $R_{bit}$ | OFDM bit rate (bps) | $R_{bit} = N_c \cdot N_{mod} \cdot R_c \cdot R_s$ |

TABLE 2-continued

| | Performance model | | | Energy model | |
|---|---|---|---|---|---|
| D(b) | PA distortion | Fitted on measurement on microsemi PA | $T_{up}$ | Transmit/Receive on time per packet (s) | $T_{up} = \dfrac{L_p}{R_{int}}$ |
| N | Receiver noise | kT · W · NF | $\eta(b)$ | PA power efficiency | Fitted on measurement microsemi PA |
| SINAD | Signal to noise and distortion ratio | $SINAD_e = \dfrac{P_{tc} \cdot A}{D(b) \cdot A + kT \cdot W \cdot NF}$ | $P_{PA}$ | PA power (W) | $P_{PA} = \dfrac{P_{pTz}}{\eta(b)}$ |
| BIER | Code Block Error Rate | BIER = f(SINAD · Nmod · Rc · 1) Fitted on Monte-Carlo Simulation Results | $E_{FEC}$ | Energy turbo-decoding (i/bit) | $E_{FEC} = 3.98 \cdot 10^{-9} \cdot L_B + 1.21 \cdot 10^{-7} \cdot I + 1.32 \cdot 10^{-9} \cdot L_b \cdot I - 3.69 \cdot 10^{-7}$ |
| PER | Packet Error Rate | $PER = 1 - (1 - BIER)^{\frac{L_p}{L_b}}$ | $E_{TX}$ | Total Transmit energy (J/bit) | $E_{Tx} = (P_{PA} + P_{FE}^T) \cdot T_{up} + E_{DSP}^T \cdot L_p$ |
| | | | $E_{Rx}$ | Total Receive Energy (J/bit) | $E_{Rx} = P_{FE}^R \cdot T_{up} + (E_{DSP}^R + E_{FEC}) \cdot L_p$ |

For the receiver, on the other hand, the energy per packet is modelled as equal to the analogue receiver power ($P_{FE}^R$) multiplied by the $T_{up}$, plus the digital receiver energy per packet, including the turbo-decoding energy expressed in function of the number of iterations and the code block size (N). The time to receive the packet is computed the same way as for the transmitter.

Table 2 summarizes the main relations and parameters of the performance and energy models. Parameter values have been captured from measurements carried out on a real advanced WLAN set-up.

As performance metrics the user data rate on top of the data link control layer (DLC) is considered and as energy consumption metric, the total energy to transmit successfully a packet. To be able to profile those metrics as a function of the system level knobs settings, considering the impact of the MAC and DLC protocols, the physical layer models are plugged into a network simulator. A two-user scenario has been defined. To evaluate the average user data rate (defined on top of the data link layer) and the corresponding energy consumption, the input queue of the transmitter is filled with 10000 packets and profile the total time and energy consumption needed to receive them correctly in the receiver output FIFO.

The simulation is carried out for every combination of the system level knobs described earlier. This leads to a variety of energy-performance trade-off points from which only the Pareto-optimal ones are retained. The latter points form a so-called optimal trade-off curve (also called Pareto curve) that gives the minimum energy to achieve a given performance in the considered channel state. Such trade-off curves are generated for standard and energy scalable systems on the 7 representative channel states. Results are depicted in FIGS. 5A-5G. The energy per transmitted bit is considered so that the results are independent of the link duty cycle. For the standard system, the 1-dB gain compression point is assumed to correspond to an output power of 36 dBm, thus a back-off of 16 dB for the maximum output power (20 dBm). Standard convolutional codes are considered according to the 802.11a standard. Modulation order, code rate and transmit power are assumed to be adaptive as in state-of-the-art link adaptation schemes. Packet size is also assumed to be adaptive, which reveals to have impact only on the worst-case channel states. For the energy scalable system, the additional system level knobs are varied according to the ranges given in Table 1. Both experiments have been carried out assuming an average path loss of 81 dB, corresponding typically to a distance of 10 m. From FIG. 6, it can be seen that with the standard system, it is always better to use the highest modulation order and code rate that go through the channel with reasonable packet error rate (i.e. 1%). This is due to the fact that the increase in energy per bit relative to the usage of a higher order modulation is compensated by the reduction in duty cycle consecutive to the increase in spectral efficiency. In that case, power management techniques based on duty cycle reduction are more effective.

The implication effect of 'lazy scheduling' on the end-to-end performance of a wireless network will now be analyzed. Further, it is investigated how the end-to-end performance versus energy can be effectively controlled by adapting the link layer 'lazy scheduling' policy. The performance on top of the transport layer is considered. Indeed, it is the latter that actually provides the communication service to the application. Application specific performance metrics are not considered, but the TCP transport protocol is used, which is by far the most used in the Internet. The impact of variable error rate has already been analyzed (see L. Zou et al., '*The effects of Adaptive Modulation on the TCP Performance*', Communications, Circuits and Systems and West Sino Expositions, pp. 262-266, 2002) but the consequence of the variable rate that would be introduced by 'lazy scheduling' has not. TCP throughput degradation resulting from varying rate and delay is discussed in Choi et al. ('*TCP Performance Analysis in Wireless Transmission using AMC*', IEEE VTC Spring, 2003) for CDMA mobile systems using adaptive modulation and coding. However, the possible control of this degradation and the trade-off with energy are not discussed in any of these related works.

From Shannon one knows that the minimum power P required to reliably transmit on a given (Gaussian) channel (characterised by a given signal to noise ratio and bandwidth) is a monotonously increasing, convex function of the targeted data rate R. This function is given by equation (1) where $R_s$ is the symbol rate (baud rate), A and $\alpha$ the constant (average path loss) and variable (fading) components of the channel attenuation. $N_o$ is the noise power density.

$$P = \frac{N_0 R_s}{A\alpha} \cdot \left(2^{\frac{R}{R_s}} - 1\right) \qquad \text{(equation 1)}$$

Figure 6:
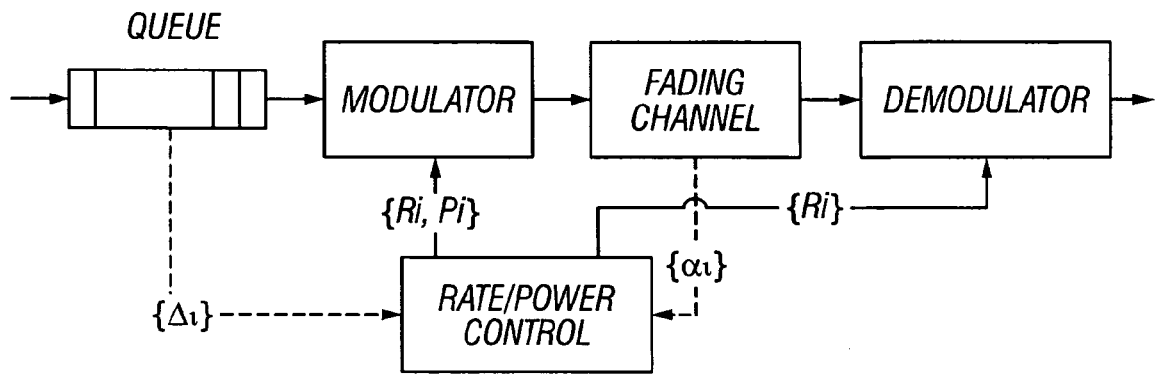
FIG. 6 represents a variable rate transmission system model.

When the channel presents a time-varying attenuation, the signal to noise ratio varies accordingly and consequently the feasible rate for a given transmit power. A radio link control scheme is designed that allows finely controlling the link performance versus transceiver power consumption trade-off by adapting automatically, per frame, the discrete link control knobs introduced previously (modulation, code rate, transmit power and linearity) to tractable channel state information. Adapting the transmit rate and power to time-varying channel conditions in order to maximize the average data rate under an average power constraint is a well-understood problem referred to as 'link adaptation'. Optimal rate and power allocation schemes have been proposed. The dual problem, i.e. minimizing the average power under an average rate constraint can effectively be considered for power management. This can be seen as an application of the 'power aware' design paradigm where performance is traded off with energy. From the data link layer point of view (where normally rate and power control are implemented), the performance is traditionally evaluated in terms of net throughput (goodput), which is the net average data rate considering possible retransmissions. When a variable rate is considered, link delay becomes a second important performance metric. Indeed, as shown in FIG. 6, a queue has to be introduced to deal with the transmission rate variation. This queue introduces a delay that dominates the transmission latency at the bottleneck link. It can be shown (Little law) that the average queuing delay ($\bar{D}$) equals the average queue backlog ($\bar{\Delta}$) divided by the average rate on the link ($\bar{R}$).

The energy versus queuing delay trade-off in such systems is extensively studied in '*Power and Delay Trade-offs in Fading Channels*', Berry, Ph.D. Thesis, MIT, Cambridge, Mass., December 2000. Long-term average power and queuing latency are considered. Using dynamic programming, policies to specify for each packet, depending on the actual queue backlog and channel gain, which rate to use are characterised. It is shown that queue stability can be guaranteed—i.e. the maximum number of bits in the queue is bounded—and the average energy versus average delay trade-off is bounded.

'Lazy scheduling' is an example of such a policy. The principle of lazy scheduling consists of looking ahead at the packet arrivals, considering a fixed time window ($T_w$). At the end of each time window, the actual queue backlog ($?_w$) is considered to compute an average rate constraint (eq. 2), which is used to compute the transmit rate and power as a function of the channel attenuation for the next window. The 'water-filling in time' algorithm can be used for that purpose. Initially, this procedure has been derived considering the information theoretical relation between transmission rate and power (eq. 1). However, this relation corresponds to a bound that practical physical layer modulation and coding schemes tend to approach but do not meet. Also, in practice, the rate cannot be varied continuously but only stepwise, e.g. by varying the modulation order (constellation size) or the coding rate. Without hampering the generality, the practical rate adaptation algorithm proposed by Schurgers (cfr. supra) is considered. In an embodiment, the adaptation policy must indicate which modulation to use as a function of the channel attenuation. It is shown that for a narrow band Rayleigh fading channel, using Quadrature Amplitude Modulation (QAM) with constellation order $2^b = 2^{2j}$, $j \in \mathbb{N}$, the optimal policy is given by equation (eq.3), where $\delta$ is obtained by solving (eq.4), $R_s$ being the symbol rate of the modulation and $\bar{R}$ corresponding to the average rate constraint. The corresponding power is given by (eq.5) where C is a constant depending on the average path loss, coding gain, receiver noise figure and targeted bit error rate.

$$\bar{R} = \frac{\Delta_w}{T_w} \qquad \text{(equation 2)}$$

$$b_i = 2 \cdot \left[\frac{1}{2} \cdot \log_2\left(\frac{\alpha_i}{\delta}\right) + 1\right] \text{ if } \alpha_i \geq \delta$$

$$b_i = 0 \quad \text{if } \alpha_i < \delta \qquad \text{(equation 3)}$$

$$2 \cdot \sum_{j=0}^{\infty} \exp(-\delta \cdot 4^j) = \frac{\bar{R}}{R_s} \qquad \text{(equation 4)}$$

$$P_i = \frac{C}{\alpha_i}(2^{b_i} - 1) \qquad \text{(equation 5)}$$

Notice further that block fading is assumed, i.e. a constant channel attenuation during the transmission of one packet. This requires the channel coherence time to be high relative to the transmit duration of one packet. Hence, the modulation does not have to be adapted during a packet transmission.

TABLE 3

| | |
|---|---|
| $R_s$ | 10 MBaud |
| C | 60 mW |
| B | {1, 2, 4, 6} |
| $P_{max}$ | 20 dBm |
| $T_c$ | 20 ms |

Considering this simple but representative model, the energy-delay trade-off achieved by lazy scheduling is evaluated. The channel state is varied according to a 8-state finite state Markov model whose transition matrix is set so that the probability density function (pdf) approximates a Rayleigh distribution of average 1 and the coherence time equals $T_c$. Further parameters are summarized in Table 3. The maximum average rate achievable with this setup, considering the transmit power limit of 20 dBm is close to 20 Mbps. In this experience, a constant input bit rate of 10 Mbps is considered, corresponding to 50% utilization of the link capacity.

Figure 7:
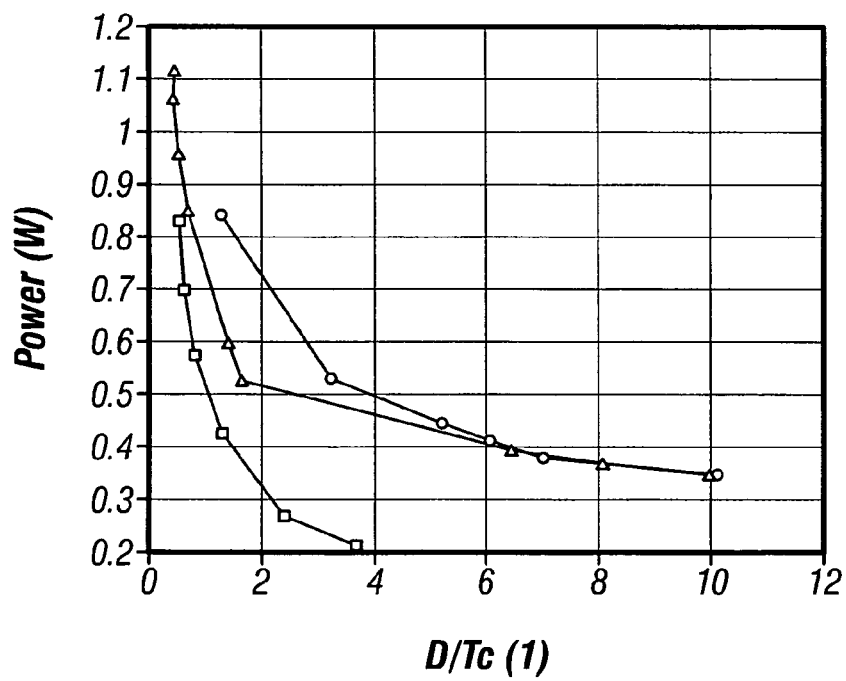
FIG. 7 represents the average power versus average delay trade-off for the optimal (hypothetical) policy (square), the original lazy scheduling (circle) and the proposed proportional control policy (triangle).

Results are depicted in FIG. 7 (circles). They are compared to the bound (optimal policy) computed for the same set-up (square). Clearly, the initial lazy scheduling performs sub-optimally when the tolerated latency is low (a short coherence time). To circumvent this drawback, instead of considering a finite time window, an adaptation of the average rate constraint with a finer grain is proposed. A proportional control is considered. The rate constraint is set proportional to the number of bits in the queue (eq.6) at a frequency corresponding to the coherence time ($T_c$).

$$\bar{R}_i = K \times \Delta_i \qquad \text{(equation 6)}$$

Here, $\bar{R}_i$ and $?_i$ denote average rate constraint and average delay, respectively, i denoting a time index. The rate/power adaptation policy is tuned continuously according to this varying average rate constraint ($\bar{R}$) in (eq.4). For a low proportionality factor (K), the system will tolerate a large average delay and react softly to the channel variation. Hence, the adaptation policy will behave close to the unconstrained water-filling in time. However, for high K, the reaction will be more aggressive, resulting in a lower average delay. For very high K, the system will always tend to select the highest modulation order possible and adapt the power according to channel inversion (i.e. boost the power for bad channels). Hence, by varying K, one can range between the two extreme link adaptation policies: water-filling in time and channel inversion.

Figure 8:
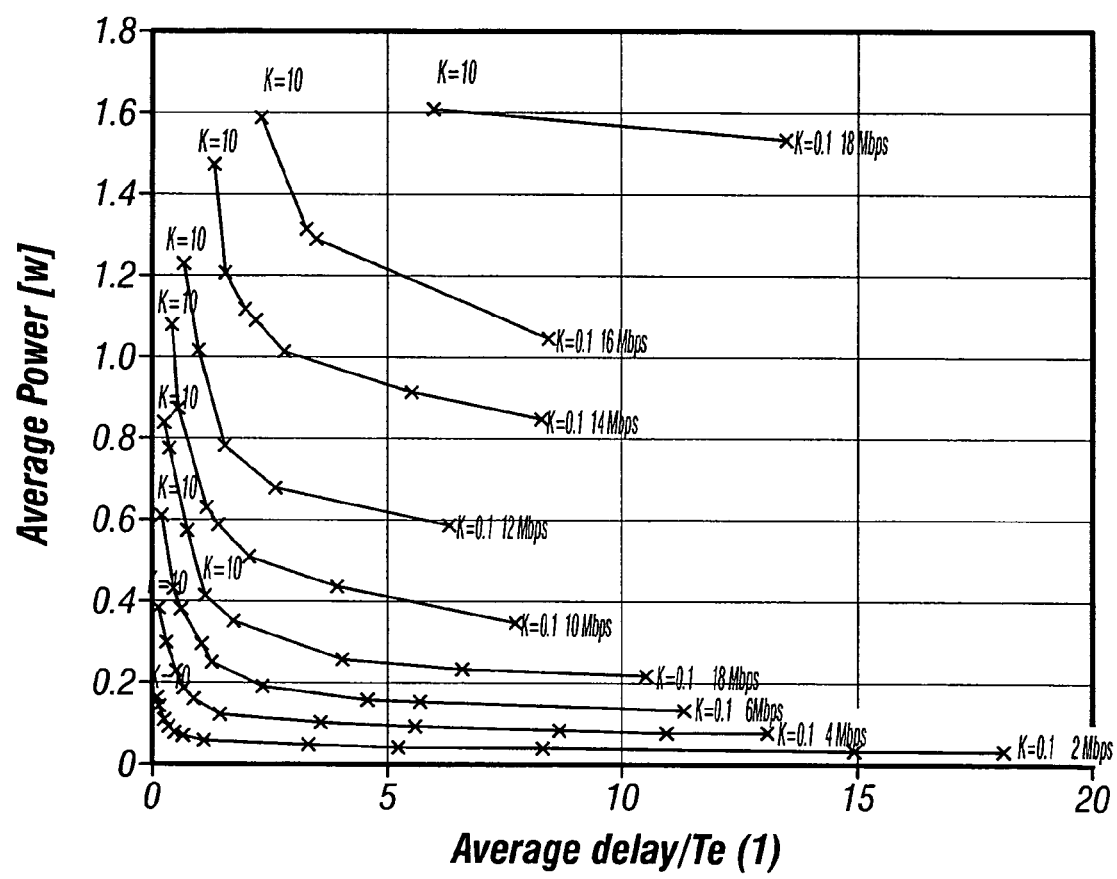
FIG. 8 represents the average power vs. average delay for different link load and different values of K. The delay axis is normalized by the control period.
Figure 9A:
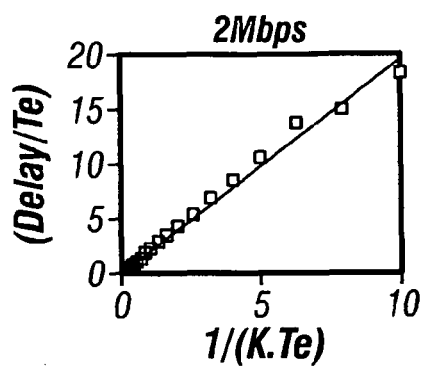
FIGS. 9A-9K represent the average delay as a function of the control parameter K in various input bit rates. Up to 80% utilization, the average delay is inversely proportional to K. At higher utilization, the proportionality is lost, the queuing behavior becoming non-linear due to congestion of the channel.
Figure 9B:
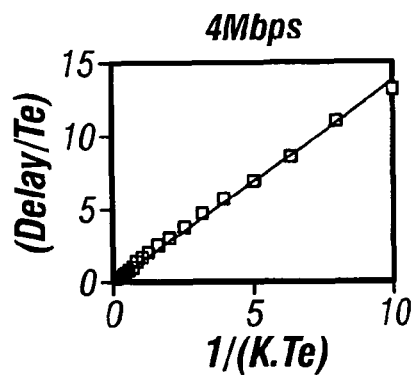
Figure 9C:
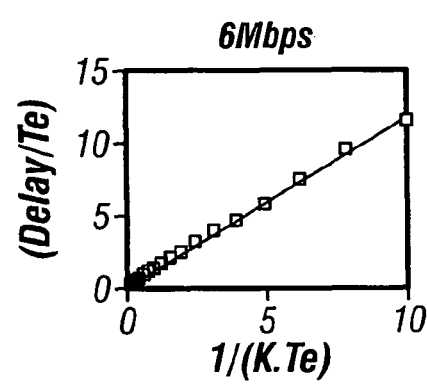
Figure 9D:
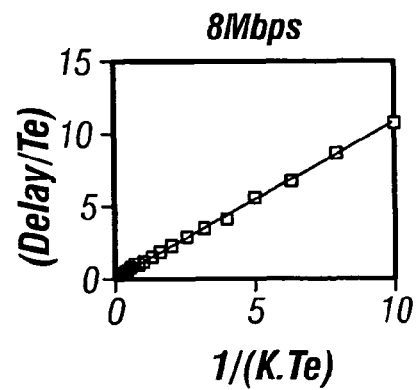
Figure 9E:
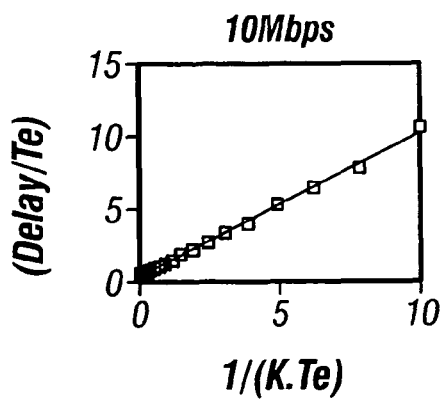
Figure 9F:
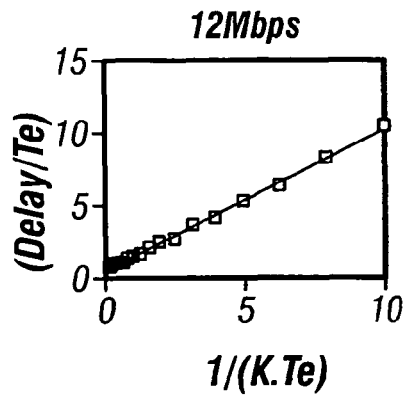
Figure 9G:
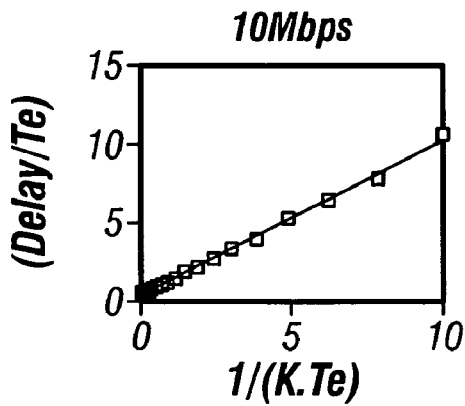
Figure 9H:
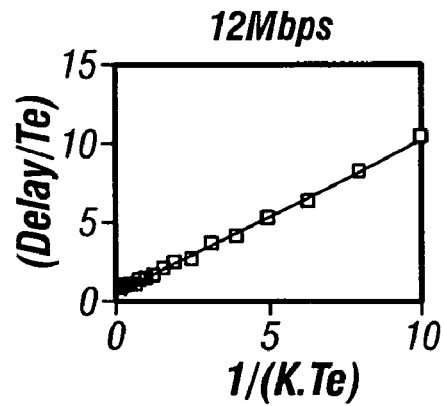
Figure 9I:
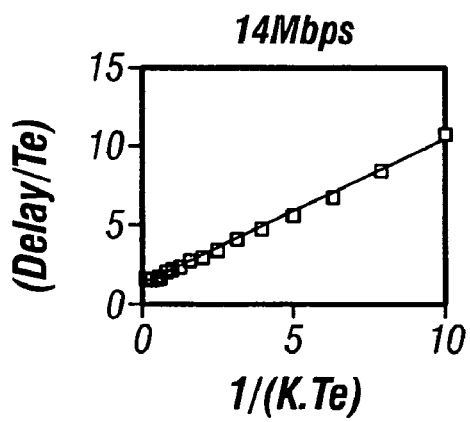
Figure 9J:
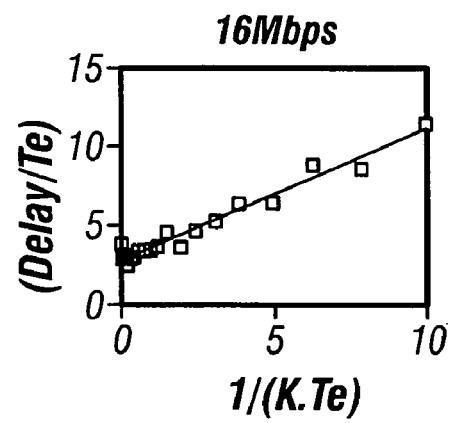
Figure 9K:
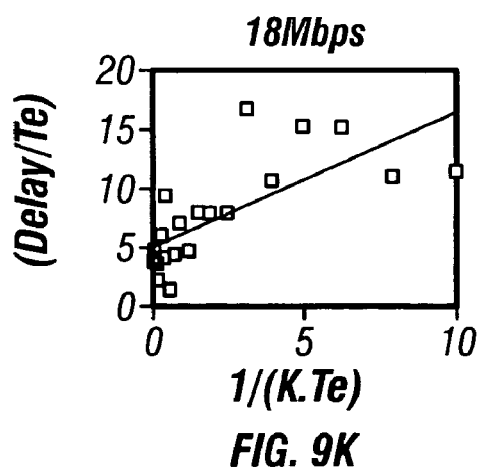

It can be seen from FIG. 7 (triangle) that the new policy beats the initial 'lazy scheduling' for smaller latencies and stays close to the hypothetic optimal policy in that region. Power-delay trade-offs for different input bit rates are depicted in FIG. 8. It can be seen that our adaptive policy offers a significant trade-off range for the average rate up to 80% link utilization. For half load (50% utilization), the average power ranges a factor 3 between the extreme adaptation policies. In FIGS. 9A-9I, the average delay for each of the different input bit rate is plotted as a function of the parameter K. It clearly appears that this knob enables to control the average delay.

Interestingly, one can notice that the proposed policy is separable: the adaptations to the queue backlog—i.e. to the traffic requirements—and to the channel can be de-coupled as far as a "constraint propagation" is added. More specifically, an average rate constraint is derived from the queue backlog. This constraint is propagated to tune the rate/power versus channel state adaptation policy. Hence, the solution can be implemented without necessarily jointly designing the rate/power adaptation (in practice, the radio link control layer) and the data link control scheduler (that controls the queue). Those layers can be designed separately, the average rate constraint being the minimal cross-layer information to be passed from one layer to another to guarantee close-to-optimal operations.

Figure 10:
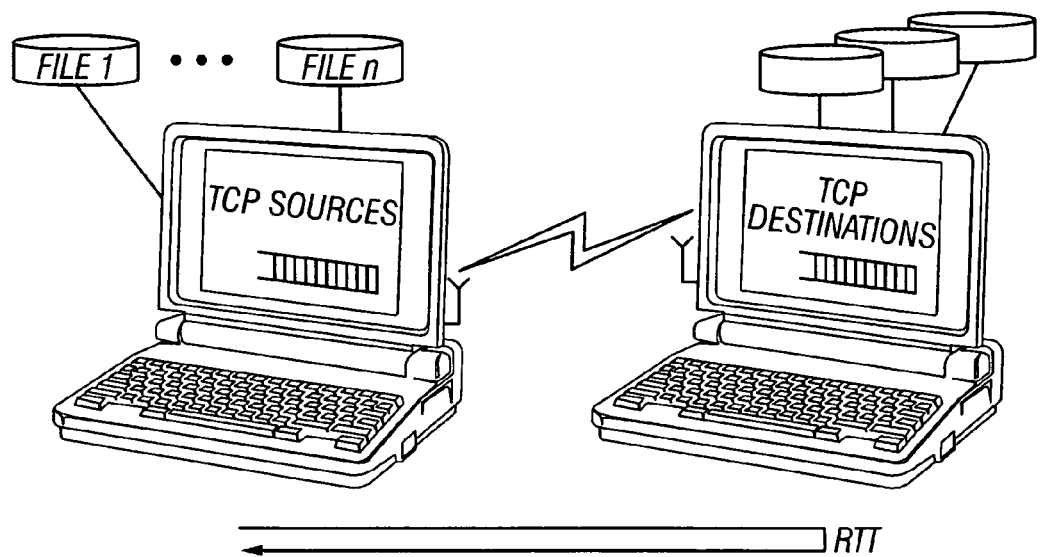
FIG. 10 represents a wireless point-to-point file transfer scenario.

So far, the energy versus performance trade-off resulting from the different 'lazy scheduling' approaches has been studied from the data link layer viewpoint only. Queuing delay and throughput on a single wireless link are considered as performance metrics. The different algorithms try to minimize the power needed to achieve these given performance metrics. Yet, to effectively study the impact of this technique on the end-to-end system performance, it is mandatory to also consider the interactions with the higher layers. Indeed, it should be understood how a bottleneck link (supposed to be the wireless link) delay and throughput translates into end-to-end system performance. The end-to-end system considered here consists of a single wireless link, corresponding e.g. to point to point scenario (FIG. 10). This is indeed the simplest scenario sufficient to show the cross-layer interactions. The single wireless terminal considered runs a number of applications, e.g. file transfers, which most probably use a TCP/IP protocol stack. The impact of an adaptive link layer on the average end-to-end TCP performance will now be shown. First the mechanism of the protocol is briefly reviewed. Secondly, it is shown how average end-to-end performance can be controlled by adapting the 'lazy scheduling' policy at link level.

TCP offers a reliable connection to the application. To enable this, acknowledgements are used to inform the source if a packet (identified with a sequence number) is well received. Using this feedback mechanism, it is possible to derive implicitly information about the possible network congestion, which occurs when the traffic sent through the network is larger than the capacity of the bottleneck link. Network congestion translates into excessive queuing delays or eventually packets drops at the bottleneck queue. Delays are discovered when the acknowledgement as a response to a sent packet is delayed more than expected by the source (i.e. a time-out event). Packet drops are translated in the reception of 'triple-duplicate' acknowledgements, i.e. the acknowledgements of packets following the lost packets contain identical sequence number. TCP reacts on this by maintaining a congestion window of W packets. Each Round Trip Time (RTT), i.e. the time between sending a packet and receiving its acknowledgement, TCP sends W packets. During congestion avoidance, the window is increased by 1/W each time an ACK is received. A TCP connection can also be in the slow start phase, where the window size is increased more aggressively. As one is mainly interested in the steady-state average behavior of TCP, this phase is not considered for the analysis. Conversely, the congestion window is decreased whenever a packets loss is detected, with the amount of the decrease depending on whether packet loss is detected by a duplicate ACK or by a time-out event. For a duplicate ACK, the window size is halved, while for a time-out it is reset to 1.

The steady-state performance of a bulk TCP flow (i.e. a flow with a large amount of data to send, such as file transfers) may be characterised by the send rate, which is the amount of data pushed by the sender per time unit. If the number of packet losses or retransmission is small, the throughput, i.e. the amount of data received per time unit, is well approximated by this send rate. Define p to be the packet loss probability of a sent TCP packet. The send rate of a bulk TCP transfer is well approximated by:

$$S = \frac{1}{RTT}\sqrt{\frac{3}{2p}} \quad \text{(equation 7)}$$

Figure 11:
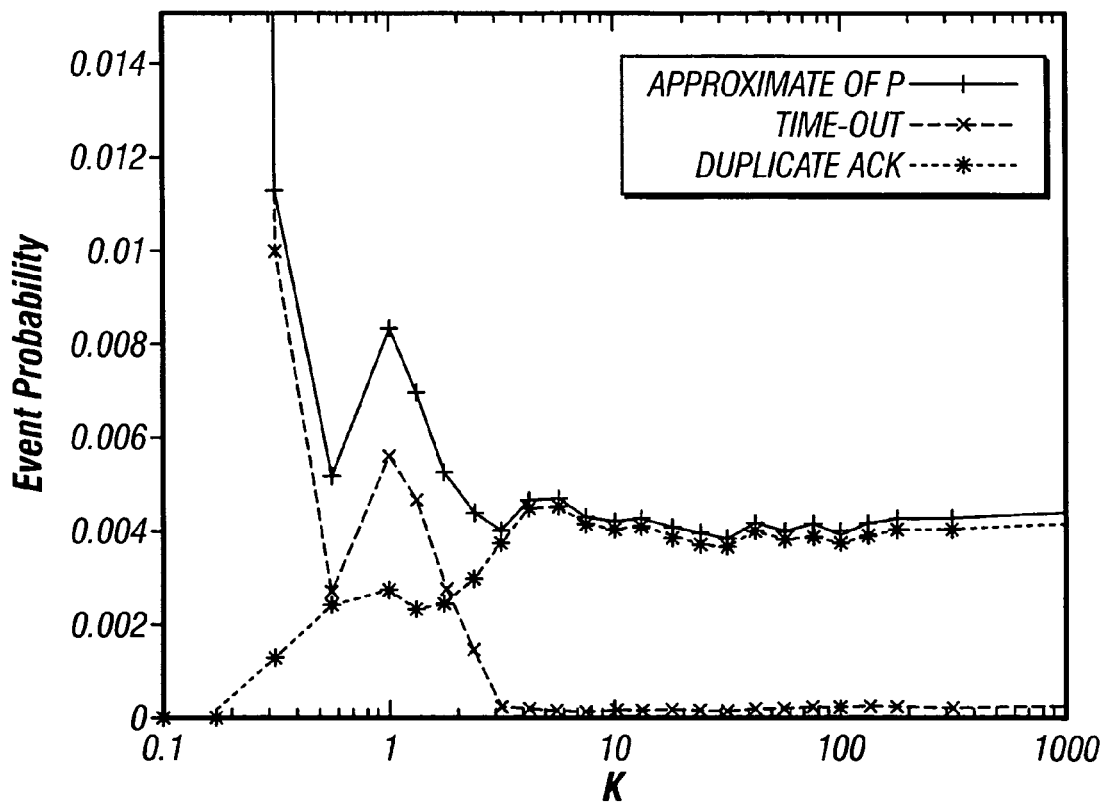
FIG. 11 represents the packet drop probability as a function of K.
Figure 12:
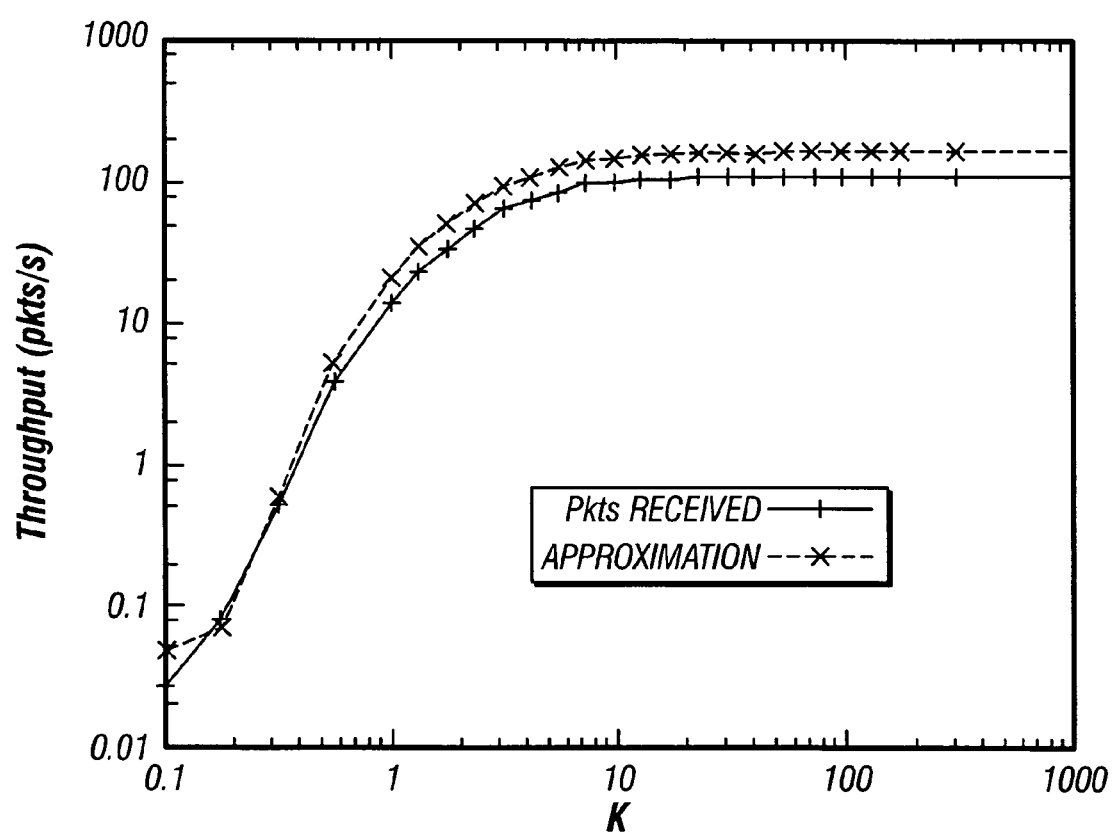
FIG. 12 represents TCP throughput per connection (i.e. one out of the 10 connections sharing the link) as a function of the control parameter K.
Figure 13:
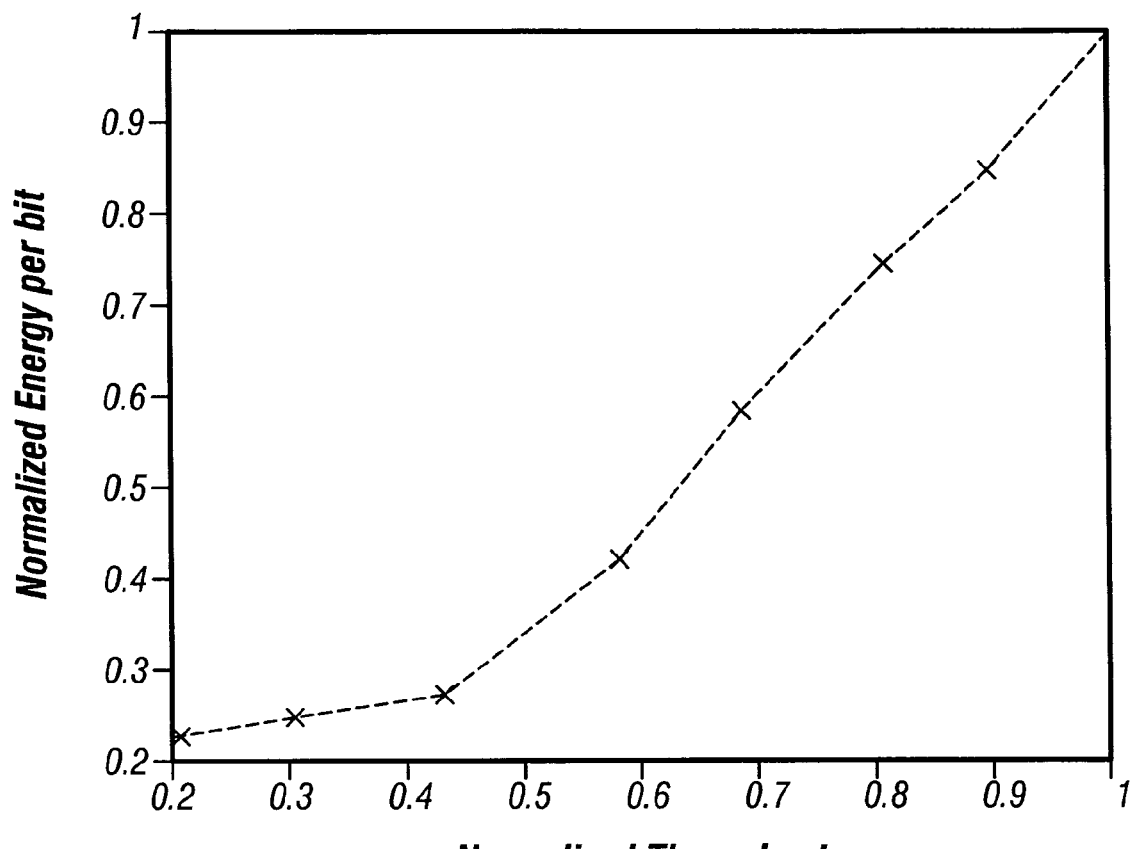
FIG. 13 represents the energy per byte versus TCP throughput trade-off achievable by tuning the link scheduling policy.

Considering a wireless link with time-varying rate, if the link adaptation is done well and MAC retransmissions are allowed, the losses at the wireless link can be neglected (to e.g. 0.1%). Hence, p is dominated by the losses or delays at the queue. Also RTT is mainly determined by the queuing delays at the bottleneck link (i.e. the wireless link). Therefore, both p and RTT depend largely on the link control parameter K. In FIG. 11, p denotes a range of K. A scenario with 10 TCP bulk transfer connections and a queue size of 128 packets is considered. The packet size is 1500 bytes. Further simulation parameters are the same as in Table 3. The loss probability p is approximated by determining a lower bound of the total number of packets lost or delayed. Hence, this gives a positive approximation of p. For small K, the throughput is determined by the link delay, which is mainly translated into time-out events. A larger K results in more aggressive TCP flows, filling the queue until a drop event, which is translated in more duplicate ACK events. The simulated TCP send rate per connection is plotted in FIG. 13, next to the value computed from equation (eq.7). The shape of the send rate is indeed well approximated by (eq.7), although it gives too optimistic values because of the optimistic approximation of p. Based on the link control parameter K, a useful range of throughput values is achieved, resulting in an end-to-end energy per byte versus throughput trade-off as depicted in FIG. 12. For readability, both throughput and energy axis are normalized to their maximum values (165 KB/s and 2 µJ/byte per connection). Energy scales in factor 2.5 when throughput scales in a factor 2, corresponding to K ranging from 2 to 10.

The above analysis shows that the end-to-end performance for bulk TCP transfer, i.e. the steady-state end-to-end throughput, is mainly determined by the queuing delay, translating into a loss probability p and the round trip time RTT. A performance constraint on top of TCP (throughput) can be translated (by eq.7) into an average delay constraint on the wireless link, provided that the latter is the bottleneck. When lazy scheduling is considered, this delay can be controlled either by the look-ahead window size (original lazy scheduling proposal) or by the proportional control parameter (K) in the scheme according to the invention. Also, recall that the proposed link adaptation policy is separable. From the average delay constraints and the actual queue backlog, an average rate constraint can be derived (eq.2 or 6) and propagated to the radio link control, which can use it to decide, for each packet, which rate and transmit power to use in order to minimize power. This observation has important consequences on the power management design paradigm. Indeed, this shows that efficient power management trading off energy with effective user-related performance metrics (here the TCP throughput) can be achieved keeping a clean, layered system architecture and its obvious advantage in terms of maintainability. Further, unintended interactions between protocols introduced by flat cross-layer design are avoided. Stack-wide power management is achieved by coordinating local algorithms by constraint propagation. The average DLC. queuing delay and average transmission rate have been shown to correspond to the minimum information passing required between the transport layer and data link control, and between data link control and radio resource control, respectively. This allows to draft the structure of a stack-wide power management scheme distributed between the traditional layers (FIG. 14), still performing as well as a flat cross-layer power management scheme.

Figure 14:
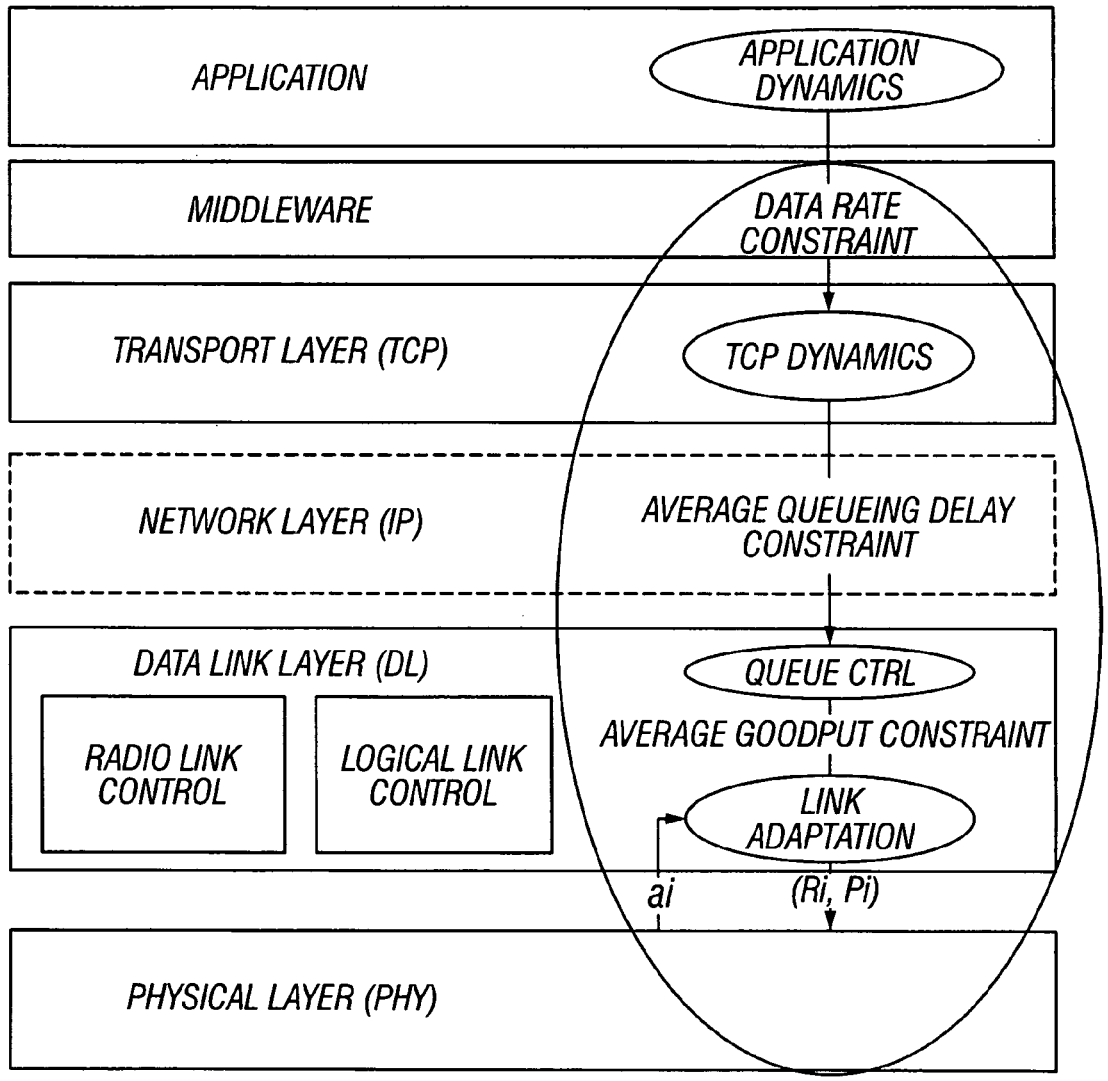
FIG. 14 represents a distributed stack-wide power management.

Referring to FIG. 14, the layers of the distributed stack-wide power management scheme, for example, include the following: application layer, middleware layer, transport layer (TCP), network layer (IP), data link layer (DL) and physical layer (PHY). The data link layer comprises radio link control and logical link control. With the distributed stack-wide power management scheme, one can conduct a method of managing the operation of a telecom system which comprises a queuing mechanism introducing a queuing delay. The method comprises: determining telecom environment conditions, which comprises current traffic requirements; determining an average rate constraint to meet the current traffic requirements, by solving an optimization problem and setting at least one control parameter, the control parameter taking into account the instantaneous queuing delay; and operating the telecom system by setting the control parameter taking into account the instantaneous queuing delay. In the method, the average rate constraint is set as a parameterizable function of the number of bits in the queue of the queuing mechanism. The parameters are control parameters. The determination of the average rate constraint is based on a look-ahead with a variable window size of link utilization. The window size is determined by said control parameter.

At run-time, the energy and performance model are calibrated (initially and whenever appropriate, still at a very low rate) to derive the actual energy/performance trade-off characteristics that are used to carry out the run-time settings adaptation at the desired (fast) rate. Parametric energy and performance models being available for the considered system, methods are now derived to carry out the run-time phase. The transmitter configuration is assumed to be done just before the transmission of the packet according to the channel conditions at that moment. The run time phase is split into two steps: a calibration (carried out at low frequency) and an effective run-time adaptation step (per packet). The latter relies on the calibrated energy/performance characteristics. Both steps are analyzed hereafter.

Figure 15:
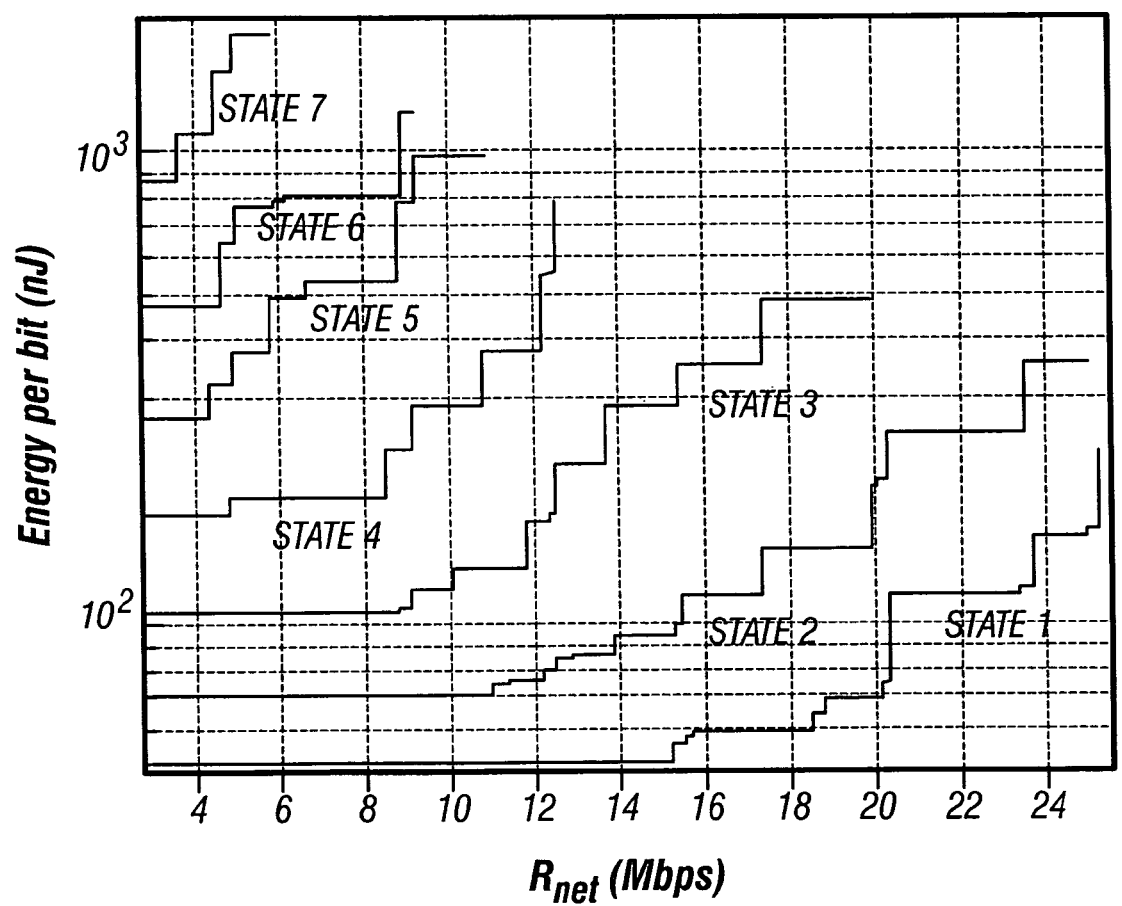
FIG. 15 represents Pareto curves obtained after calibration for a path loss of 80 dB.

Knowing all parameters, included those measured at run-time (e.g. the average path loss), the energy per bit vs. goodput trade-off characteristic can be derived for each channel state. From the initial configuration space—i.e. the set of combination of control knobs settings (modulation order, code rate, transmit power and power back-off)—those corresponding to Pareto optimal trade-offs in the energy per bit versus goodput plane are stored in a table. This corresponds to the so-called calibration. At this point, the energy per bit is considered as energy metrics in order to maintain two independent axes. Indeed, for a given configuration, the energy per bit is constant while the average power depends on the rate and on the duty cycle. If the knobs setting range is limited, an exhaustive search in the configuration space is still possible. If the number of knobs and/or the range is larger, then heuristics should be used. Notice that this search has to be performed only when the model is recalibrated (when entering the network or when the average path loss changes significantly), so the time and energy overhead involved in this is not really that critical. FIG. 15 depicts the results of the calibration with the considered model for an average path loss of 80 dB, corresponding typically to a distance of 10 m indoor. One step-curve (Pareto curve) represents the Pareto-optimal energy-rate trade-off for a given channel state. Each of these points corresponds to a given ($N_{mod}$, $R_c$, $P_{Tx}$, b) setting. This implies that selecting one point on one of these curves corresponds to deciding jointly about the carrier modulation ($N_{mod}$), the code rate ($R_c$), the transmit power ($P_{tx}$) and the backoff setting (b) to be used.

The knobs settings corresponding to Pareto-optimal energy-rate trade-offs are known for each channel state from the calibration. Yet, this is not sufficient to carry out effective energy aware radio link control. A policy to decide which configuration point to use when a given channel state is detected, is needed. A trivial policy would select, on the Pareto curve corresponding to the current channel state, the point providing the goodput just larger than the user data rate requirement. Obviously, such a policy is sub-optimal from the power viewpoint. Indeed, since the constraint is the average goodput, it would be more effective to reduce the rate on the bad channel states (where the cost in energy to maintain a given rate is high) and compensate by increasing it on the good channel state (where the cost is lower). This is the principle underlying the water-filling algorithm proposed in '*The Capacity of Downlink Fading Channels with Variable Rate and Power*', A. J Goldsmith, IEEE Trans. Veh. Techn., Vol. 46, No. 3, August 1997. Yet, one cannot directly apply this algorithm here due to the discrete nature of the set-up. Therefore, first the structure of the problem is analyzed.

Let ($r_{ij}$, $e_{ij}$) be the coordinates of the $i^{th}$ Pareto point on the curve corresponding to channel state j. The average power $\bar{P}$ and rate $\bar{R}$ corresponding to a given radio link control policy—i.e. the selection of one point on each Pareto curve—can be expressed by (eq.8) and (eq.9) where $x_{ij}$ is 1 if the corresponding point is selected, 0 otherwise. $\omega_j$ is the probability of the channel state j.

$$\bar{P} = \sum_j \psi_j \sum_i x_{ij} e_{ij} r_{ij} = \sum_i \sum_j x_{ij} \psi_j e_{ij} r_{ij} \triangleq \sum_i \sum_j x_{ij} p'_{ij} \quad \text{(equation 8)}$$

$$\bar{R} = \sum_j \psi_j \sum_i x_{ij} r_{ij} = \sum_i \sum_j x_{ij} \psi_j r_{ij} \triangleq \sum_i \sum_j x_{ij} r'_{ij} \quad \text{(equation 9)}$$

The notation $p'_{ij}$ and $r'_{ij}$ is introduced corresponding to the power and rate, respectively, when the channel state is j and the $i^{th}$ point is selected on the corresponding curve, both weighted by the probability to be in that channel state. Only one Pareto point can be selected when being in one channel state, resulting in the following constraints:

$$\sum_i x_{ij} = 1, \forall j \quad x_{ij} \in \{0, 1\} \qquad \text{(equation 10)}$$

For a given rate constraint R, the optimal control policy is the solution of the following problem:

$$\min \sum_i \sum_j x_{ij} p'_{ij} \text{ subject to } \sum_i \sum_j x_{ij} r'_{ij} > R \qquad \text{(equation 11)}$$

This is the classical multiple choice knapsack problem. One is interested in the family of control policies corresponding to R ranging from 0 to Rmax; Rmax being the maximum average rate achievable on the link. This family is called the radio link control strategy. Let kj denote the index of the point selected on the jth Pareto curve. Formally, kj=i ⇔xij=1. A control policy can be represented by the vector k={kj}. The control strategy is denoted {k(n)} corresponding to the set of point $\{(\overline{R}^{(n)}, \overline{P}^{(n)})\}$ in the average rate versus average power plane. A good approximation of the optimal radio link control strategy (i.e. that bounds the trade-off between $\overline{R}$ and $\overline{P}$) can be derived iteratively with a greedy heuristic explained in the flowchart shown in Table 4 below. Notice that this derivation is done when the energy-performance trade-off characteristics per state (the Pareto curves in FIG. 15) change, i.e. if recalibration occurs.

TABLE 4

Let $k^{(0)}$ be the solution of (11) when R = 0. Obviously it corresponds to $\{x_{0j} = 1 \, \forall j\}$, i.e. the point of coordinate (0,0) is selected on each Pareto curve.
Denote the so-called current policy, $k^{(n)} = \{K_j^{(n)}\}$; the next policy $k^{(n+1)}$ corresponding to the just higher rate constraint can be computed as follows:

Compute the slopes $s_j^{(n)} = \dfrac{p'_{(k_j^{(n)}+1)j} - p'_{(k_j^{(n)})j}}{r'_{(k_j^{(n)}+1)j} - r'_{(k_j^{(n)})j}} \forall j$ Define $\hat{j}^{(n)} = \arg \max_j (s_j^{(n)})$ The next policy $k^{(n+1)}$ is such as $k_j^{(n+1)} = k_j^{(n)} + 1$ and $k_j^{(n+1)} = k_j^{(n)}, \forall j = \hat{j}$ From the family of policies derived with the greedy heuristic, it is possible to derive a policy for any average rate constraint ($\notin \{\overline{R}^{(n)}\}$ also). For the given average rate constraint, from the set are selected those policies that lead to a average rate just higher ($R_h$) and just lower ($R_l$) than the constraint (R). For a given packet transmission, the configuration knobs are set according to one of these policies. The selection is done randomly with probability $P_h$ and $P_l=1-P_h$, respectively, where $P_h$ is given by equation (12)

$$P_h = \frac{R - R_l}{R_h - R_l} \qquad \text{(equation 12)}$$

Doing this, the final average power versus average rate characteristic is the linear interpolation between the trade-off points $\{(\overline{R}^{(n)}, \overline{P}^{(n)})\}$.

Figure 16:
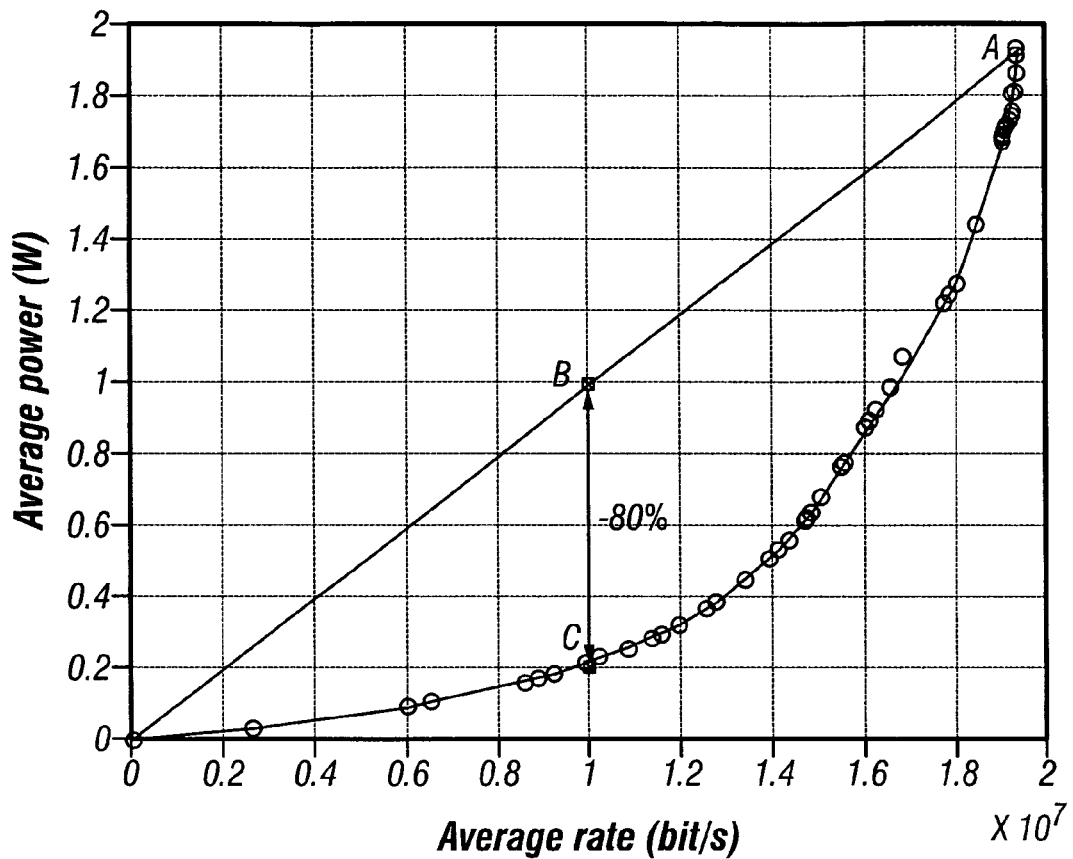
FIG. 16 represents the average power versus average goodput trade-off achieved by the proposed radio link control strategy (circle) compared to the traditional goodput maximizing strategy. The plain line corresponds to the optimal selection.

The performance of the proposed radio link controller is evaluated in the average rate versus average power plane. Results are depicted in FIG. 16. The trade-off curve achieved by the control strategy derived with the greedy heuristic (circles) is compared to the optimal solution of (eq. 11) for the range of R (plain line). Theoretically, the greedy heuristic is sub-optimal since the Pareto curves in FIG. 15 are not necessarily convex. Yet, it clearly appears that the optimal solution is closely approached. This trade-off curve can be used to evaluate the benefit of the proposed strategy compared with traditional radio link control aiming at maximizing the data rate under power constraint. With such a strategy, the policy corresponding to the highest feasible rate would be selected. This corresponds to the point A in FIG. 16. If the link capacity is not fully used, the link idles and the terminal enters regularly in sleep mode. The average power decreases linearly with the duty cycle. Hence, the corresponding power-rate trade-off is represented by the dashed-dot line in FIG. 16. It can be seen that, in all cases, except the one corresponding to maximal load, the proposed energy aware radio link control strategy saves power when compared with the traditional strategy. For example at half load, the gain reaches 80%.

In another embodiment the invention relates to wireless communication systems that are provided with a sleep mode. Further also the multi-user aspect is introduced in the scheme to manage system-wide power management dimensions at runtime as described below.

Figure 17:
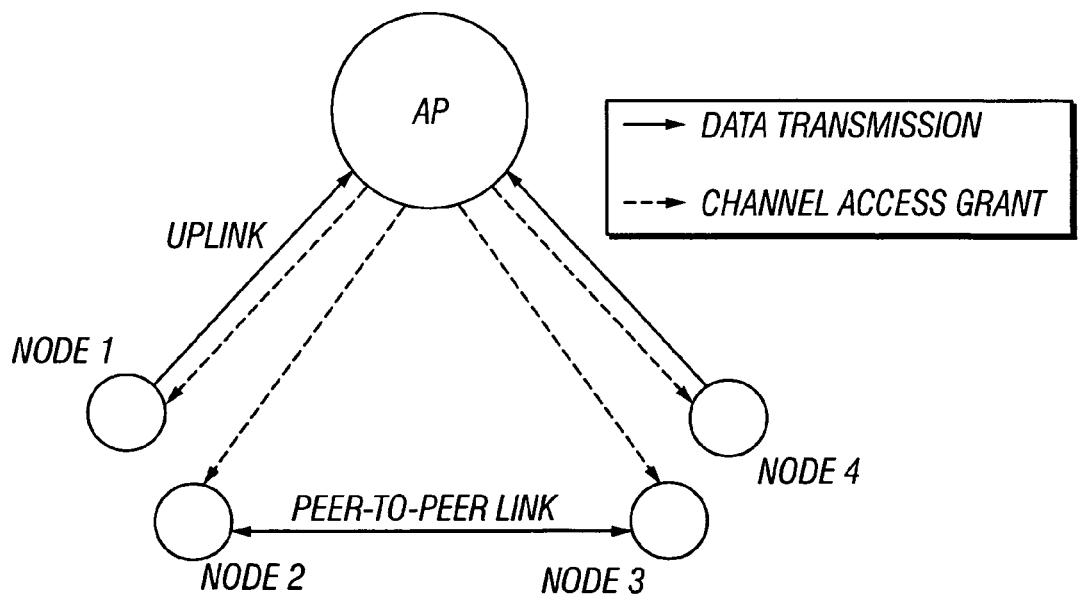
FIG. 17 represents a centrally controlled LAN/PAN topology illustrating uplink and peer-to-peer communication.

In the wireless network as in FIG. 17 multiple nodes are controlled centrally by an access point (AP). Each node (such as e.g. a handheld video camera) wishes to transmit frames at real-time and it is the AP's responsibility to assign channel access grants. In an embodiment, the resource allocation scheme within the AP must ensure that the nodes meet their performance constraints by delivering their data in a timely manner while consuming minimal energy. More formally the problem can be stated in the following way. The network consists of n flows $\{F_1, F_2, \ldots, F_n\}$. For notational simplicity, a one-to-one mapping of flows to nodes is assumed, but the design methodology is applicable to one or more flows per node. Each flow i, 1≤i≤n, is described by the following properties:

(a) Cost Function ($C_i$): This is the optimization objective, e.g. to minimize the total energy consumption of all users in terms of Joules/job. In for example a video context, a job is the frame size of current application layer video frame.

(b) QoS Constraint ($Q_i$): The optimization has to be carried out taking into account a minimum performance or QoS requirement in order to satisfy the user. As delivery of real-time traffic is of interest (e.g. video streaming), the QoS is described in terms of the job failure rate (JFR) or deadline miss rate. JFR is defined as the ratio of the number of frames not successfully delivered before their deadline to the total number of frames issued by the application. The QoS constraint is specified by the user as a target-JFR (JFR*), to be maintained over the lifetime of the flow.

(c) Shared Resource $\{R_1, R_2, \ldots, R_m\}$: Multiple resource dimensions could be used to schedule flows or tasks in the network, e.g. time, frequency or space. The restricted case is considered here where access to the channel is only divided in time. Therefore, time is the single shared resource and is denoted by R. The resource fraction consumed by the $i^{th}$ node is denoted by $R_i$. The maximum time available for any flow is $R_i^{max}$, which is the frame period for periodic traffic.

(d) Control Dimensions $\{K_1, K_2, \ldots, K_l\}$: For a given wireless LAN architecture, there are platform independent control knobs or dimensions as already described before that control the received signal-to-noise ratio related to the resource utilization in terms of the transmission time per bit, given the current path loss. The control dimension settings are discrete, inter-dependent and together have a non-linear influence on the cost function.

(e) System state $\{S_1, S_2, \ldots, S_s\}$: As the environment is very dynamic, the system behavior will vary over time. The environmental factors independent of the user or system control are represented by a system state variable. In a wireless environment with e.g. VBR video traffic, the system state is determined by the current channel state and the application data requirements. The scheduling algorithm is executed periodically based on the channel epoch and the rate at which the data requirements change. Each flow is associated with a set of possible states, which determines the mapping of the control dimensions to the cost and resource.

The following system properties contribute to the structure of the methodology. The key aspects are the mapping of the control dimensions to cost and resource profiles respectively, and the general properties of this mapping. A resource (cost) profile describes a list of potential resource (cost) allocation schemes needed for each configuration point K. These profiles are then combined to give a Cost-Resource trade-off function, which may be essential for solving the resource allocation problem.

Cost Profile Properties

Every flow has a known minimum and maximum cost over all control dimensions, which is a function of the desired JFR* and the current system state (e.g. channel state). The cost range (difference between maximum and minimum) is important as this determines the impact the control dimensions have on the system cost.

The per-dimension discrete control settings can be ordered according to their minimal associated Cost.

The overall system cost, C, may be defined as the weighted sum of costs of all flows, where each flow can be assigned a certain weight depending on its relative importance or to improve fairness.

$$C = \sum_{i=1}^{n} w_i C_i \qquad \text{(eq. 13)}$$

Resource Profile Properties

Every flow has a known minimum and maximum resource requirement across dimensions, which is a function of the desired JFR* and system state.

Depending on the current system constraints and possible configurations, each flow has a minimum resource requirement $R_i^{min}$. It is assumed all minimum resource requirements can be satisfied at each moment in time. Hence, no overload occurs and all flows can be scheduled. This is a reasonable assumption under average load and average channel conditions. However, under worst-case conditions and non-scalable video applications, a system overload may occur and one or more flows will need to be dropped. While the policy to drop flows is out of the scope of the optimization criterion, a practical system may employ a policing policy that is fair to the users.

The per-dimension discrete control settings can be ordered according to their minimal associated Resource requirement.

The overall system resource requirement R is defined as the sum of the per flow requirements:

$$R = \sum_{i=1}^{n} R_i \qquad \text{(eq. 14)}$$

The goal is to assign transmission grants, resulting from an optimal setting of the control dimensions, to each node such that the per flow QoS constraints for multiple users are met with minimal energy consumption. For a given set of resources, control dimensions and QoS constraints, the scheduling objective is formally stated as:

$$\min_{C} \sum_{nodes} \omega_i C_i(S_i) \qquad \text{(eq. 15)}$$

subject to:

$JFR_i \leq JFR_i^*, i = 1, \ldots, n$ (QoS Constraints)

$\sum_{nodes} R_{i,j} \leq R_j^{max}, j = 1, \ldots, m$ (Resource Constraints)

$K_j \to R_i(S_i), i = 1, \ldots, n; j = 1, \ldots, l$ (Resource Profiles)

$K_j \to C_i(S_i), i = 1, \ldots, n; j = 1, \ldots, l$ (Cost Profiles)

The solution of the optimization problem yields a set of feasible operating points K, which fulfill the QoS target, respects the shared resource constraint and minimizes the system cost.

When considering energy-scalable systems, the number of control dimensions is large and leads to a combinatorial explosion of the possible system configurations as already explained. In addition, the resource and cost profile relations are complex. In order to solve this problem efficiently, a pragmatic scheme is needed to select the configurations at runtime. This is achieved by first determining the optimal configurations of all control dimensions at design time. At runtime, based on the channel condition and application load, the best operating point is selected from a significantly reduced set of possibilities.

A property of the design-time phase model is that the configurations can be ordered according to their minimal cost and resource consumption, describing a range of possible costs and resources for the system. For each additional unit of resource allocated, one only needs to consider the configuration that achieves the minimal cost for that unit of the resource. For each possible system state (for different channel and application loads), the optimal operating points are determined by pruning the Cost-Resource (C-R) curves to yield only the minimum cost configurations at each resource allocation point.

Figure 18:
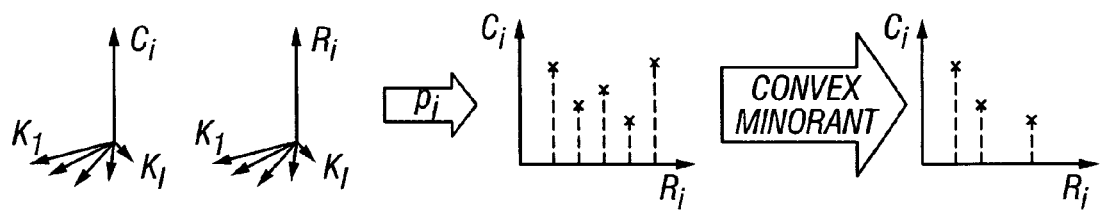
FIG. 18 represents the determination of a pruned $C_i(R_i)$ mapping to be used at runtime, starting from a cost and resource profile.

A function $p_i: R \to C$ is defined, such that $$p_i(R_i(S_i)) = \min\{C_i(S_i) | (K_i \to R_i(S_i)) \wedge (K_i \to C_i(S_i))\}$$

which defines a mapping between the Resource and the Cost of a certain configuration, k, for a node in a state, $S_i$, as shown in FIG. 18. Considering the resulting points in the C-R space, one is only interested in those that represent the optimal trade-off between the energy and resource needs for the system. Indeed, the trade-off between transmission time and transmission energy is a fundamental property for wireless communication, bounded by Shannon. Although the discrete settings and non-linear interactions in real systems lead to a deviation from this optimal trade-off, it can be well approximated as follows.

The convex minorant of these pruned curves is calculated along both for the Cost and Resource dimensions, and the intersection of the result is considered. As a result, the number of operating points is reduced significantly thus rendering it very useful for the runtime optimization (FIG. 18).

Several trade-offs are present in the system: increasing the modulation constellation size decreases the transmission time but results in a higher packet error rate (PER) for the same channel conditions and PA settings. In an embodiment, the energy savings due to decreased transmission time must offset the increased expected cost of re-transmissions. Also, increasing the transmit power increases the signal distortion due to the PA. On the other hand, decreasing the transmission power also decreases the efficiency of the PA. Similarly, it is not straightforward when using a higher coding gain, if the decreased SNR requirement or increased transmission time dominates the energy consumption. Finally, considering the trade-off between sleeping and scaling: a longer transmission at a lower and more robust modulation rate needs to compensate for the opportunity cost of not sleeping earlier.

A greedy algorithm is employed to determine the per-flow resource usage $R_i$ for each application to minimize the total system cost C. The algorithm traverses all flows' Cost-Resource curves and at every step consumes resources corresponding to the maximum negative slope across all flows. This ensures that for every additional unit of resources consumed, the additional cost saving is maximum across all flows. The current channel state and application demand are assumed to be known for each node. This information is obtained by coupling the MAC protocol with the resource manager and is explained in the next section. By the assumption that sufficient resources are available for all flows, the optimal additional allocation to each flow, $R_i > 0$, $1 \leq i \leq n$, subject to $$\sum_{i=1}^{n} R_i \leq R$$

is determined.

The following greedy algorithm is used:
a. Allocate to each flow the smallest resource possible for the given state, $R_{min}$. All flows are schedulable under worst-case conditions, hence $$\sum_{i=1}^{n} R_{min} \leq R.$$

b. Let the current normalized allocation of the resource to flow, $F_i$, be $R_i$, $1 = i = n$. Let the unallocated quantity of the available resource be $R_1$.
c. Identify the flow with the maximum negative slope, $|C_i'(R_i)|$—representing the maximum decrease in cost per resource unit. If there is more than one, pick one randomly. If the value of the minimum slope is 0, then stop. No further allocation will decrease the system cost further.
d. Increase $R_i$ by the amount till the slope changes for the $i^{th}$ flow. Decrement $R_l$ by the additional allocated resource and increment the cost C by the consequent additional cost. Return to step b until all resources have been optimally allocated or when $R_l$ is 0.

In this implementation, the configuration points at design-time are sorted in the decreasing order of the negative slope between two adjacent points. The complexity of the runtime algorithm is O(n. log L) for n nodes and L configuration points per curve. For a given channel and frame size, the number of configuration points to be considered at runtime is relatively small.

Taking into account that the relation $C_i(R_i)$ derived at design time is a convex trade-off curve, it can be shown easily that the greedy algorithm leads to the optimal solution for continuous resource allocation. The proof can be extended for real systems with discrete working points to show that the solution is within bounded deviation from the optimal. For a real system, however, the settings for different control dimensions such as modulation or transmit power are in discrete units. This results in a deviation from the optimal resource assignment. The worst-case deviation from the optimal strategy is bounded and small.

Again the practical example of an OFDM-based wireless LAN system is now considered. As previously discussed, several control dimensions can be identified that enable to trade-off performance for energy savings and vice versa. As above the power amplifier back-off ($P_{back-off}$), the power amplifier transmit power ($P_{TX}$), the modulation ($N_{Mod}$) and the code rate ($B_c$) are considered.

To determine the Job Failure Rate and total expected energy consumption, it may be essential to consider the system dynamics, which include the current channel condition and the application demand. The current job size (in number of fragments) varies significantly for video traffic. In addition, just considering the average received SINAD is not sufficient to characterize the channel for wireless OFDM systems where frequency-selective fading is important. A time-varying channel model is considered and expressions are derived relating the average packet error rate (PER), the JFR and expected energy consumption.

1) Traffic Model

As the goal is to provide timeliness (QoS) guarantees while minimizing energy consumption for a target performance, periodic delay-sensitive traffic is considered. Both constant bit rate (CBR) and variable bit rate (VBR) traffic is studied, in order to show the impact of the dynamics. VBR traffic consists of MPEG-4 flows. A Transform Expand Sample (TES) based MPEG-4 traffic generator that generates traffic with the same first and second order statistics as an original MPEG-4 trace is used. All fragmentation is done at the link layer and if a frame is not completely delivered to the receiver by its deadline, it is dropped. All applications employ UDP over IP.

Each frame size in fact maps to a different system state. A frame size is determined in a number of MAC layer fragments, which is assumed to be 1024 bytes long for this experiment. From the results, it is observed that for a given frame size, extrapolating the results for a curve within five fragments results in a very low approximation error. As the maximum frame size is assumed to be 50 fragments long in the tests considered, Cost-Resource curves are only constructed for 1, 2, 3, 4, 5, 10, 20, 30, 40, 50 fragments per frame.

2) Channel Model

A frequency selective and time varying channel model is now used to compute the PER for all transceiver knob settings. An indoor channel model based on HIPERLAN/2 was used for a terminal moving uniformly at speeds between 0 to 5.2 km/h (walking speed). This corresponds theoretically to a coherence time of approximately 28 ms. A set of 1000 time-varying frequency channel response realizations (sampled every 2 ms over one minute) were generated and normalized in power. Data was encoded using a turbo coder model and the bit stream was modulated using 802.11a OFDM specifications. For a given back-off and transmit power, the SINAD at the receiver antenna was computed as before. A path-loss of 80 dB at a distance of 10 m is assumed.

Figure 19A:
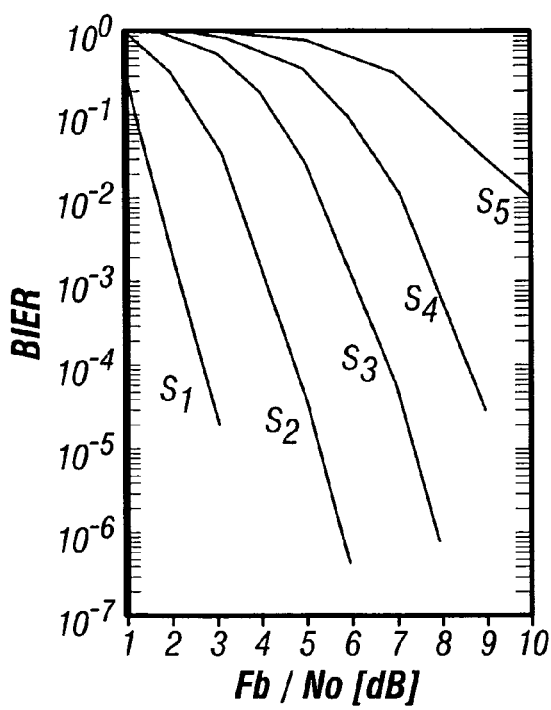
FIG. 19A represents the performance across different channel states.
Figure 19B:
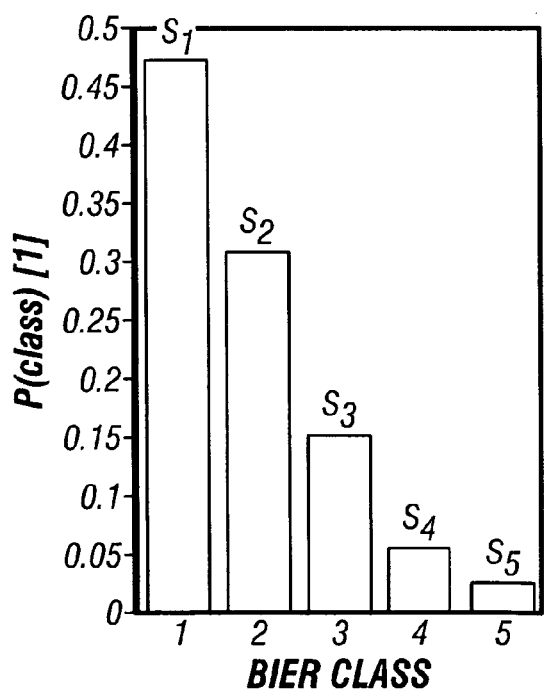
FIG. 19B is a channel state histogram of a probability of occurrence based on the channel realizations database.

The signal was then equalized (zero-forcing scheme), demodulated and decoded. From the channel realization database, a one-to-one mapping of SINAD to receive block error rate was determined for each modulation and code rate. The channel was then classified into 5 classes (FIG. 19A). In order to derive a time-varying link-layer error model, we associate each channel class to a Markov state, each with a probability of occurrence based on the channel realizations database (FIG. 19B). Given this five-state error model, the PER can be efficiently modelled for different configurations at runtime. The Packet Error Rate (PER) is obtained by assuming the block errors follow a binomial process for a packet size of $L_{frag}$ bits and a block size of 288 bits (see also Table 2):

$$PER=[1-(1-BlER)^{L_{frag}/288}] \quad\quad (eq. 16)$$

Now the exact mapping of the control dimensions K to the cost and resource dimensions is derived, based on these expressions and the system state. When delivering a frame, different transmission and retransmission strategies can be used, each resulting in a different total expected energy and time to send the frame, and each resulting in another expected failure rate for the frame. To simplify, the policy is adopted that each fragment of a frame should be transmitted or retransmitted using the same configuration K. This is a good approximation for the real optimal transmission strategy, which includes adapting the strategy depending on the outcome of a fragment transmission (conditional recursion which is complex to solve). For the approximation, a recursive formulation can be derived to compute the expected energy $E_K$, the timeslot needed $TXOP_K$, and the expected failure rate $JFR_K$, for each system state. The MAC protocol overhead is taken into account in this mapping, and the parameters, which are based on 802.11 e, are listed in Table 2. A Contention Free access scheme is considered for the transmissions.

Consider a frame, which consists of m fragments or packets and has to be delivered during a known channel state $C_S$. The tuple $(C_S,m)$ is defined as the system state. All following expressions for cost and resource consumption, hence, depend not only on the configuration K, but also on the system state. For notational simplicity, the state index is omitted. Each packet is transmitted with configuration K, for which the $PER_K$ can be determined, based on the models derived above. The probability that the frame is delivered successfully with exactly (m+n) transmissions (hence n retransmissions), is given by the recursion:

$$S_n^m(K) = \sum_{i=1}^{min(m,n)} C_i^m \times (PER_K)^i \times (1-PER_K)^{m-i} \times S_{n-i}^i(K) \quad (eq. 17)$$

$$S_0^m(K) = (1-PER_K)^m \quad\quad (eq. 18)$$

in which $C_i^m$ denotes the number of possibilities to select i objects out of m. Hence, the probability to deliver the frame consisting of m fragments correctly with maximum n retransmissions is $$1 - JFR_n^m(K) = \sum_{j=0}^{n} S_j^m(K) \quad\quad (eq. 19)$$

Here only data losses are assumed to result in job failures. As control frames are much shorter and less susceptible to errors, it is assumed they do not suffer from packet errors.

Figure 20:
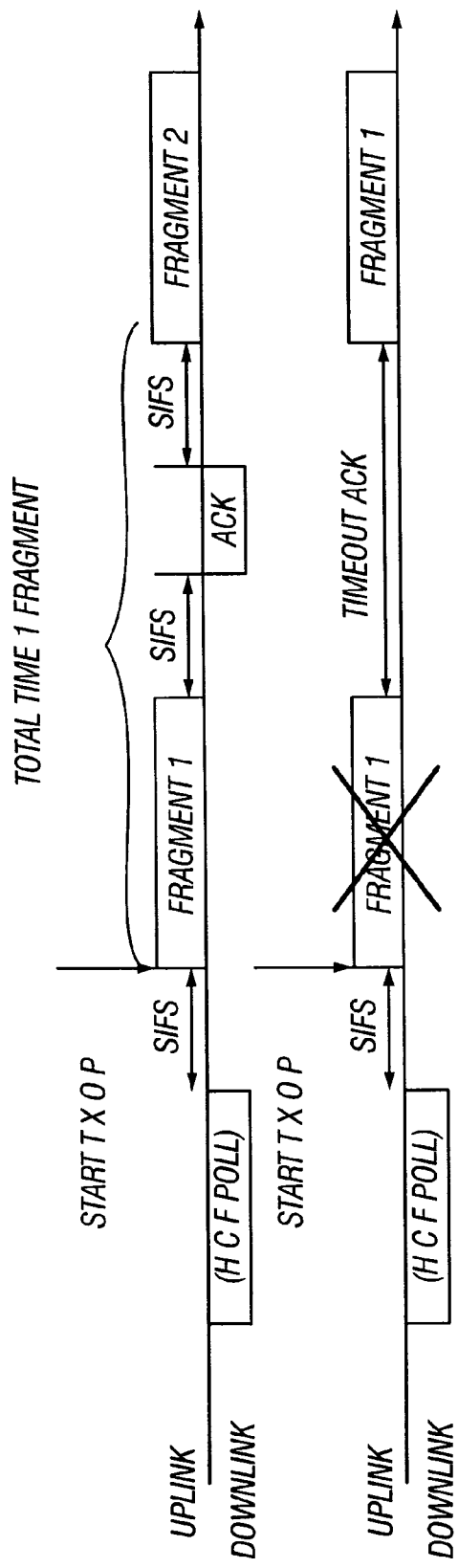
FIG. 20 represents the timing of successful and failed uplink frame transmission under the HCF and the scheme according to the invention.

In order to determine the expected energy and time needed to deliver a frame with m fragments and n retransmissions, one needs to know the overhead due to the MAC protocol for a successful and a failed transmission, i.e. $E_{good}$, $E_{bad}$, $T_{good}$ and $T_{bad}$. As a 802.11e HCF-type MAC is assumed, a successful and failed data transmission follow FIG. 20. Let $E_{ACK}$ be the energy needed to receive an ACK packet, and $T_{ACK}$ the time needed for the ACK, $E_{Header}$ and $T_{Header}$ are the overheads for the MAC and PHY headers.

$$E_{good}(K)=E_K+E_{Header}+(2\times T_{sifs}\times P_{Idle})+E_{ACK} \quad (eq.20)$$

$$E_{bad}(K)=E_K+E_{Header}+((2\times T_{sifs}+T_{ACK})\times P_{Idle}) \quad (eq.21)$$

$$T_{good}(K)=T_K+T_{Header}+(2\times T_{sifs})+T_{ACK} \quad (eq.22)$$

$$T_{bad}(K)=T_{good}(K) \quad (eq.23)$$

The time needed to send m fragments with max n retransmissions, for configuration K, is then:

$$TXOP_n^m(K)=[m\times T_{good}(K)]+[n\times T_{bad}(K)] \quad (eq.24)$$

The average energy needed to transmit m fragments, with maximum n retransmissions, and configuration K is a bit more complex. The reason is that one is interested in the expected energy, taking into account the chance that a retransmission should happen or not:

$$E_n^m(K) = \sum_{j=0}^{n} S_n^m(K) \times ((m \times E_{good}(K)) + (j \times E_{bad}(K))) \quad (eq. 25)$$

It is the sum of the probability that the transmission will succeed after m good and j bad transmissions, times the energy needed for these good and bad transmissions. In order to have the correct expected energy consumption, a second term should be added to denote the energy consumption for a failed job, hence when there are less than m good transmissions, and (j+1) bad ones:

$$E_n^m(K) = E_n^m(K) + JFR_n^m(K) \times [E_{bad}(K) + \sum_{j=1}^{m} S_n^j(K) \times ((j \times E_{good}(K)) + (n \times E_{bad}(K)))] \quad (eq. 26)$$

Figure 21A:
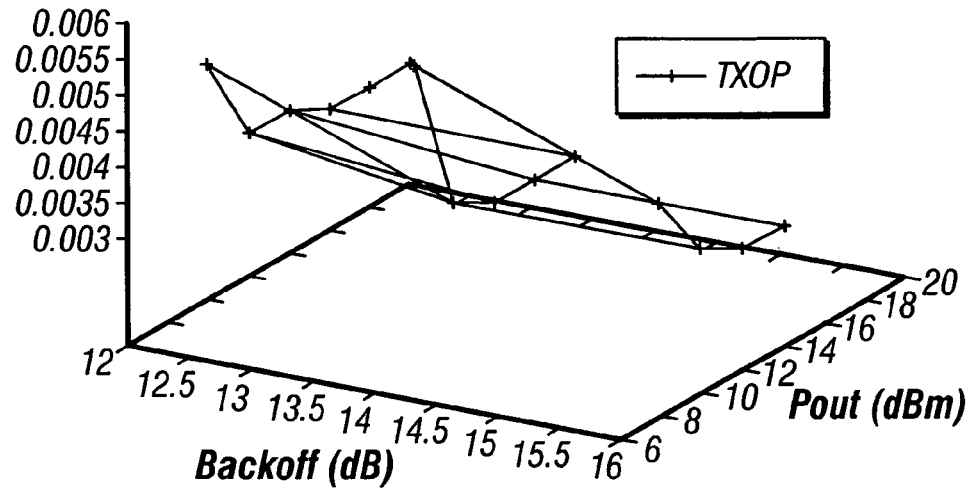
FIGS. 21A and 21B represent the mapping for the PA output power and back-off control dimension for a fixed setting of the modulation and code rate control dimensions.
Figure 21B:
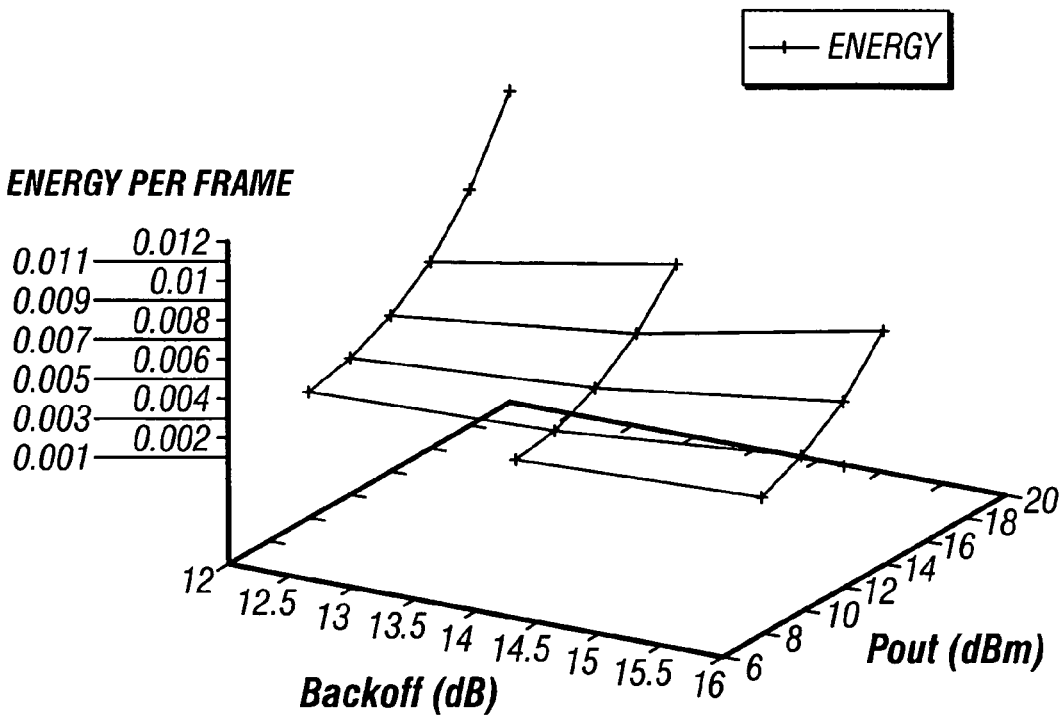
Figure 22A:
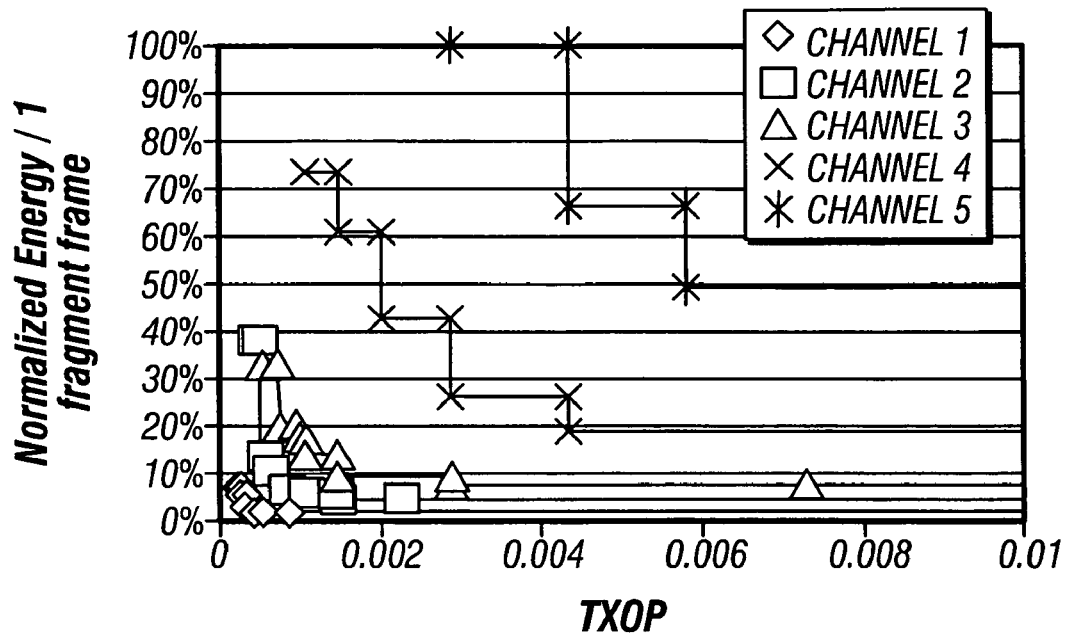
FIG. 22A represents $C_i(R_i)$ curves in different channel states for 1 fragment.
Figure 22B:
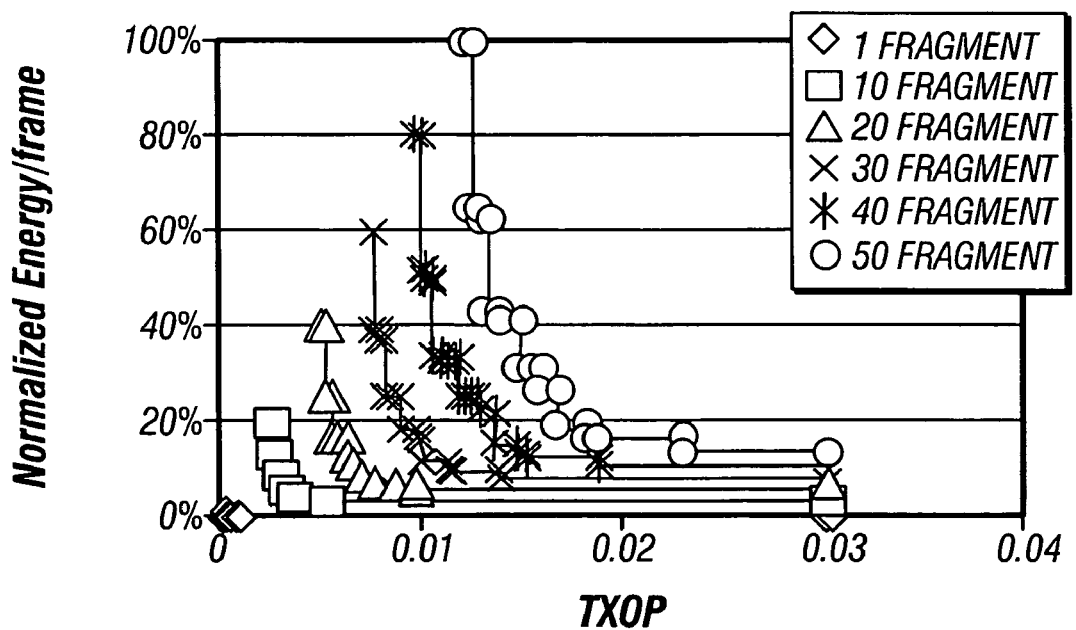
FIG. 22B represents $C_i(R_i)$ curves for different frame sizes in channel state 1.

As a result, the E, TXOP, and JFR can be determined as a function of frame size, channel state and number of retransmissions for each configuration K. This determines the full cost and resource profile for the system. In FIGS. 21A and 21B, the impact of the PA control knobs (PA back-off and PA transmit power) on the resource (TXOP) and cost (energy) is illustrated. Only the mapping that corresponds to the smallest TXOP and energy consumption is plotted (hence the mapping with the smallest number of retransmissions that achieves the required JFR* of 10e-3). FIGS. 22A and 22B shows the merged and pruned energy-TXOP curves for different channel states and different frame sizes, respectively. One can see that the total range in energy consumption is large, both within and across system states. The large trade-off illustrates the fact that traditional systems, which are designed for a fixed and worst cast scenario, result in a significant energy waste.

Determining a schedule that achieves the required performance with minimal energy consumption is challenging because the instantaneous load and channel state vary independently for each node. Previously the Energy and TXOP were determined needed to deliver a job depending on the current state, which is the frame size and the channel state. Based on these curves for each node, the scheduler can derive a near-optimal allocation at run-time. There needs to be a feedback loop between the nodes and the scheduler in the AP. The current state information needs to be collected by the scheduler and the decisions about the channel access grants should be communicated back to the nodes with minimal overhead. It is now shown how a sleep-aware Medium Access Controller can take care of this.

The MAC is responsible for resource allocation of the shared channel among different users. The packet-scheduling algorithm in the AP decides which node is to transmit, when, and for how long. The focus of frame scheduling is on the particular cases of frames sent from a node to its associated AP (uplink) and also from one node directly to another and not via the commonly associated AP (peer-to-peer), as in FIG. 17. As all nodes are assumed to be within the transmission range of the AP, the AP can only schedule one peer-to-peer communication simultaneously. All nodes communicate only when they have a valid channel access grant or transmit opportunity (TXOP) or timeslot from the AP.

In order to instruct a node to sleep for a particular duration, the AP needs to know when the next packet must be scheduled. Waking a node earlier than the schedule instance will cause it to waste energy in the idle state. Waking the node later than the schedule instance, will cause it to miss the packet's deadline or waste system resources. The sleep-aware MAC protocol therefore employs two techniques to eliminate data dependency due to the application and channel. By buffering one frame, the AP can instruct the node to sleep from the time it was informed that the frame arrived to its scheduling instance. The AP still needs to poll the node upon frame arrival and therefore this only permits the node to sleep between the packet arrival instance and the packet schedule instance.

Figure 23:
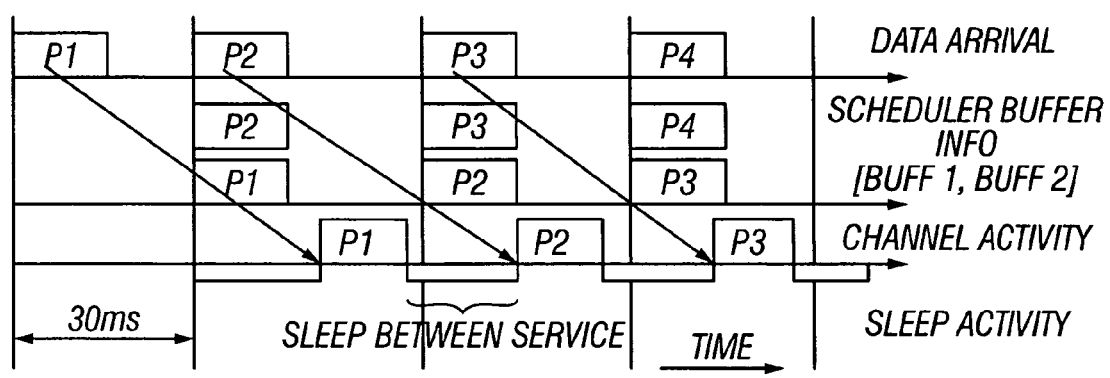
FIG. 23 represents the two-frame buffering.

Buffering just two frames informs the AP of the current traffic demand but also the demand in the next scheduling instance. As shown in FIG. 23, the AP now only needs to communicate with the node at scheduling instances. As the real-time stream's packets are periodic, all idle time between transmission instances is eliminated for the ideal scheme.

In order to inform the AP of the instantaneous channel and the required application load for the current and next scheduling instances, one needs to employ a link-layer feedback mechanism. This is accomplished by adding just three bytes in the MAC header for the current channel state and the two buffered frame sizes. Protocols such as 802.11e provide support for channel information and queue sizes therefore require only minor modifications. In every transmission to the AP, the node communicates its channel state and packet sizes of the two heads of the line packets. In the acknowledgement, the AP instructs the node to sleep until the time of the next scheduling instance and also assigns it the duration of its next TXOP or resource slot. The scheduling decision is, thus, made every frame period (e.g. 30 ms for high-quality video) of the flow in the system with the highest frame rate.

The energy savings are now verified over a range of practical scenarios. For all results presented here, the target JFR* is set to $10^{-3}$ which is a reasonable value for wireless links. First the expected energy savings are analyzed across all channel states and the entire range of system loads. While this is profiled at design-time, it provides insight as to (a) the range and variation of energy savings with the system dynamics and (b) the contributions of energy savings from sleeping and scaling under different conditions. Following this, the energy savings at runtime are studied for both constant bit rate (CBR) and MPEG-4 video flows under different channel conditions. In order to evaluate the relative performance of MEERA, the following comparative transmission strategies are considered:

1. MEERA: This is the optimal operating scheme considering the energy trade-off between sleep and scaling. The operating point is determined from the C-R curves and the runtime algorithm described previously.
2. MEERA-no sleep: This scheme uses the C-R curves to determine the optimal TXOP when no sleeping is possible. The same runtime algorithm is used and the nodes remain in the idle state after completion. The purpose of this case is to show the contribution of sleeping under different loads.
3. Fixed: In this scheme the back-off and output power are fixed to the highest setting and use take the highest feasible modulation and code rate that will successfully deliver the packets. After successful transmission, one goes to sleep. This case is the approach where no scaling is employed and the sleep duration is maximized.
4. Fixed—no sleep: This scheme is similar to Fixed, but the transceiver remains in the idle mode after successful transmission. This is the base operating scheme of current wireless LAN transceivers with no power save features enabled.

Figure 24A:
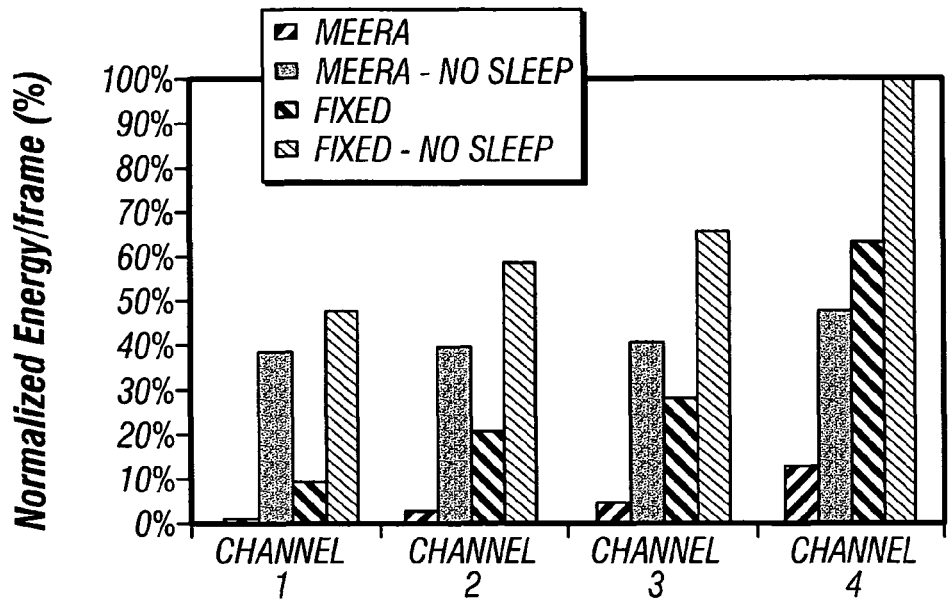
FIG. 24A represents expected energy consumption across different channel states for 1 fragment frame size.
Figure 24B:
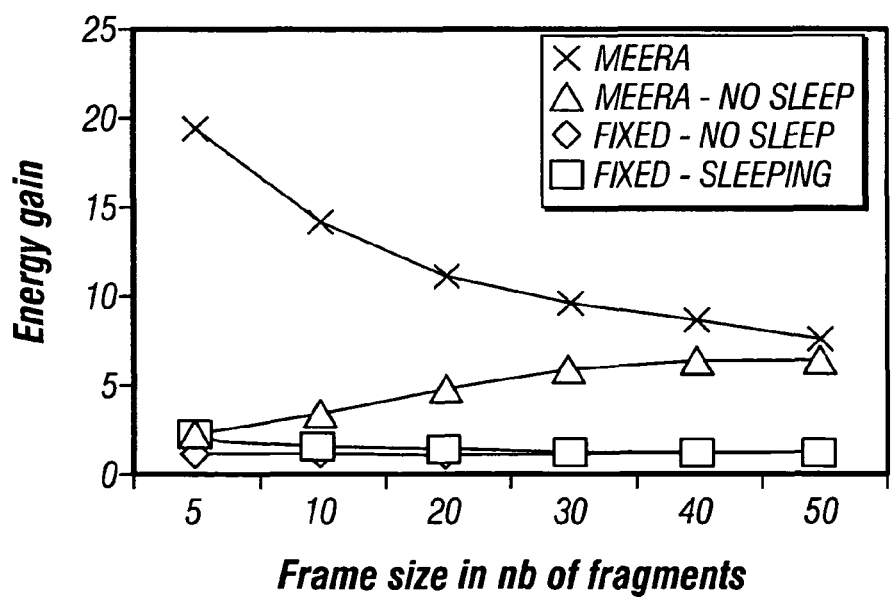
FIG. 24B represents relative energy consumption by sleeping and scaling for different system loads in the best channel state.

Consider the C-R curves in FIG. 22, for transmitting a one-fragment sized frame over different channel states. If the TXOP assignment for the user is distributed uniformly over time, the expected energy consumption is proportional to the area under the $C_i(R_i)$ curve for each channel state shown in FIG. 22(*a*). Similarly, the C-R curves are derived for the three comparative transmission strategies discussed above. The $C_i(R_i)$ curve, for the fixed case, for example, is in fact a fixed point (at small TXOP), and the expected energy consumption proportional to the area under a horizontal line through this point. In FIG. 24A, the relative energy consumption (normalized by the maximum energy consumed by Fixed over all cases), is plotted for the four schemes over different channel states. As expected, MEERA outperforms the other techniques since it takes advantage of the energy that can be saved by both sleeping and TXOP scaling. The energy needed to transmit a unit of data increases from best to worst channel state due to a combination of (a) the lower modulation rate necessary to meet the higher SINAD requirement (hence shorter sleep duration), (b) a higher required output power to account for the worse channel and (c) the increased cost of retransmissions. It can be observed, for example, for the best channel state, the energy consumption is low for both the Fixed and MEERA approaches. The energy gains for this channel state primarily result from sleeping. On the other hand, for the worst channel state, the transmission energy becomes more dominant, the energy gains due to TXOP scaling are more significant. When looking at the energy gains contributed by sleeping and scaling over a range of link utilizations, the energy gains due to TXOP scaling can be expected to dominate when the transmission duration is large when compared to the sleep interval. Hence, for larger frame sizes or at higher per-flow link utilization, the relative energy saving due to scaling has a grater influence. This observation is illustrated in FIG. 24B, where the relative gain for the different techniques—compared to the Fixed-no sleep case—are plotted over a series of frame sizes (in terms of number of 1024 byte fragments), for channel state 1. Indeed, for a 5-fragment frame TXOP, scaling and sleeping (represented by MEERA-No sleep and Fixed-sleeping respectively) have a comparable performance. For larger frame sizes, the TXOP scaling in MEERA-No sleep contributes significantly to the energy savings.

Figure 25A:
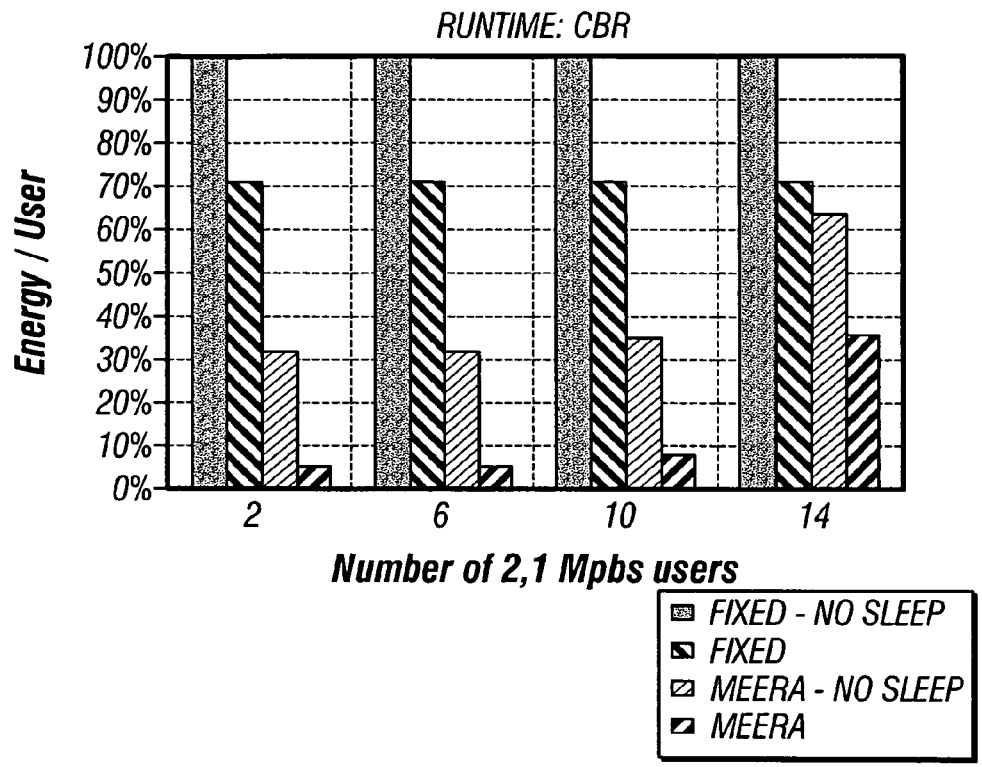
FIG. 25A represents energy consumption per flow as a function of the aggregate system load for CBR traffic.
Figure 25B:
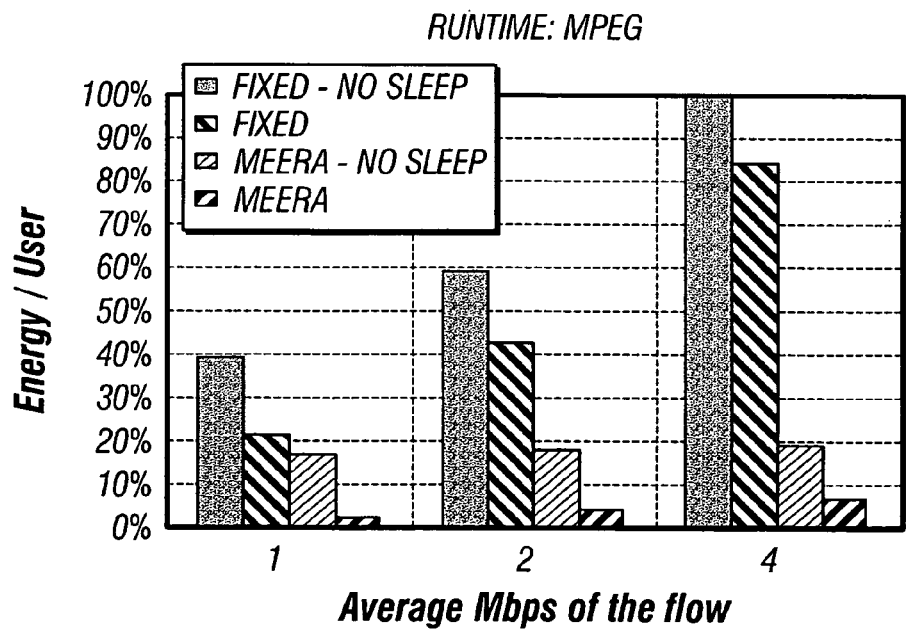
FIG. 25B represents energy consumption per flow as a function of mean per-flow data rate for MPEG traffic.

Now a multiple-user scenario is considered where the TXOP assignments are not uniformly distributed but based on the user's application data rate requirement and the constraints enforced by other users sharing the same link. The influence is now discussed of the aggregate link utilization on the per-flow energy consumption for CBR flows over a static channel. The effective throughput of 802.11e, after considering protocol overheads for the first channel state, is approximately 30 Mbps when the highest modulation constellation is used. In the experiment illustrated by FIG. 25A, the link utilization is increased in steps of 2 Mbps CBR flows up to the maximum link capacity. The per-flow energy consumption of MEERA increases as the aggregate system load increases. At higher loads due to a large number of flows, a smaller TXOP from the C-R curve is assigned to each flow resulting in higher per flow energy consumption. The difference with the case where only TXOP scaling is used (MEERA-no sleep) is most noticeable since the possibility to scale is reduced with increasing system load. In a multi-user scenario it is always beneficial to include sleeping as it is influenced to a lesser extent by aggregate load increases due to other flows. On the other hand, if the load is increased by increasing the per-flow throughput requirement for a fixed number of flows, the gain of scaling dominates over sleeping. In FIG. 25B, the average per-flow data rate requirement is increased for an MPEG-4 flow (in a network with five such flows). In this case, the reduction of sleep duration increases the energy consumption only slightly as the energy saving from scaling start contributing more. This is evident when comparing MEERA with the energy consumption of Fixed, which increases almost linearly with the data rate. It is important to note that as the system is not forced into overload, only moderate link utilization is considered (<70% average link utilization using the highest transmission rate) for MPEG-4 flows.

Figure 26A:
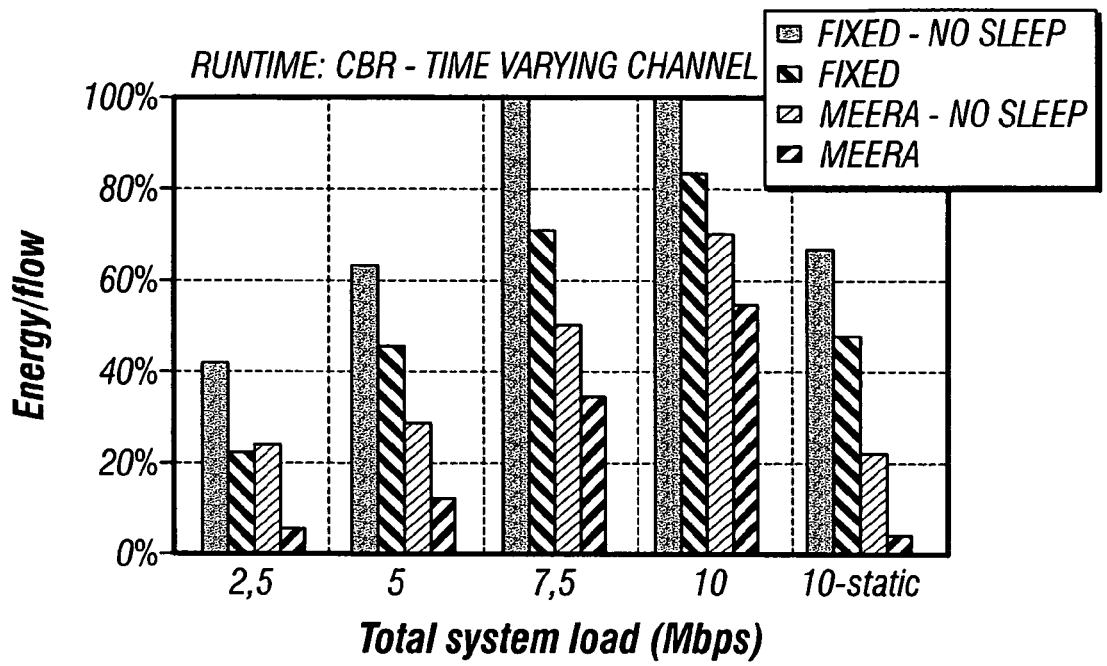
FIG. 26A represents energy consumption for CBR traffic over a time-variant channel as function of aggregate system load
Figure 26B:
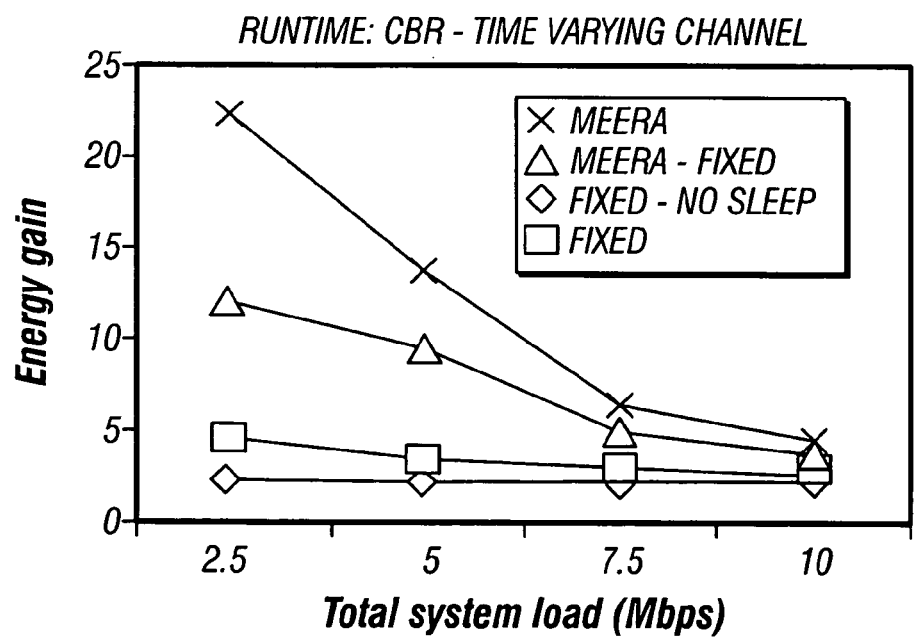
FIG. 26B represents energy gains for sleeping versus scaling for time-variant channel.

Now the energy consumption trends are considered for a time-varying channel. A 5-user scenario is used to understand the impact of dynamic channel variations on energy consumption. The channel varies independently over all the users on a frame-by-frame basis. In FIG. 26A, the total system load is increased from 2.5 Mbps to 10 Mbps for five CBR flows. When compared to the same system load where the channel is in the best (fixed) state, an increase in energy consumption is observed. This is because during every scheduling cycle, the flows experiencing worse channel states require more transmission time (due to lower constellation) and therefore consume more energy. In addition, they force the other flows to transmit in a smaller TXOP and increase their energy consumption too. Further, in FIG. 26B the energy savings achieved when compared to Fixed-no sleep over different system load are shown. Sleeping results in an energy saving for all loads, which is obvious in a multi-user scenario. However, comparing the gain MEERA achieves to the Fixed approach (with sleeping), MEERA results in a significant additional gain of a factor 2 to 5 depending on the system load. The combination of sleep and scaling in MEERA yields an overall system gain factor from 2 to 9.

Figure 27:
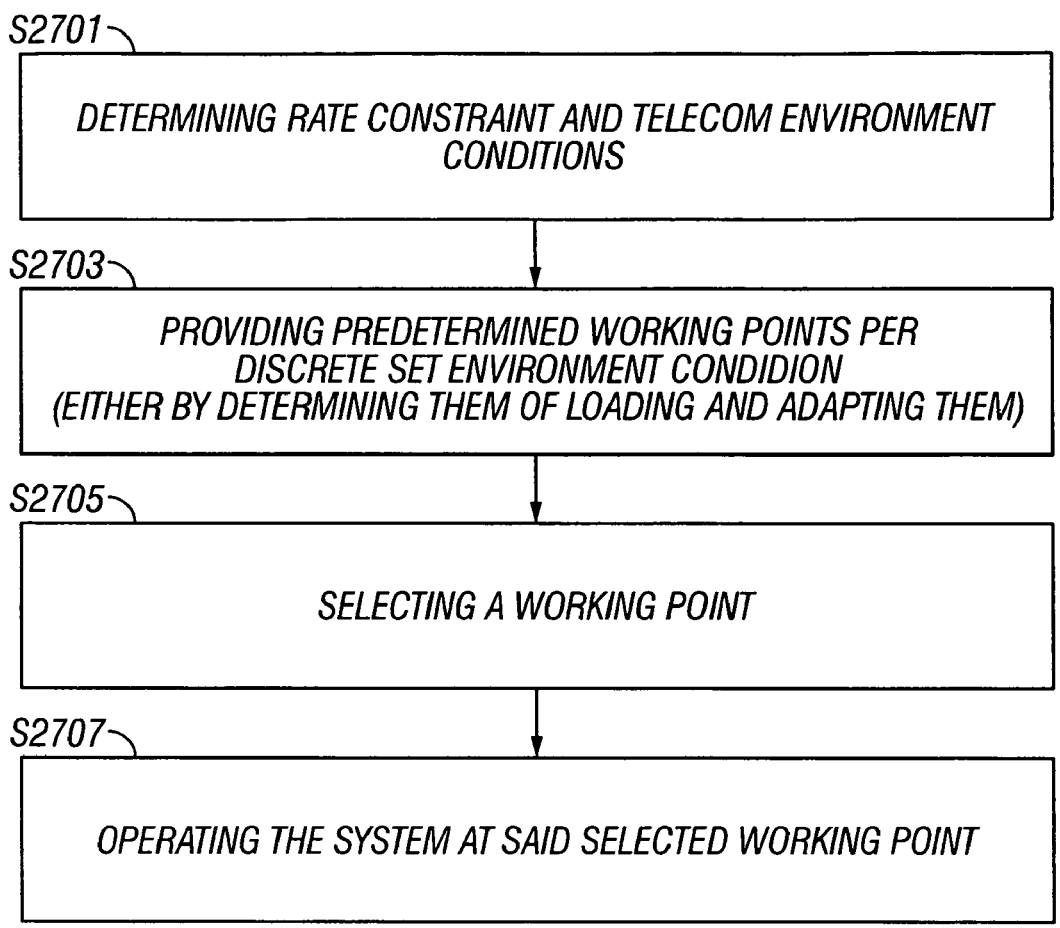
FIG. 27 is a flowchart of an embodiment for managing the operation of a telecom system.

FIG. 27 is a flowchart of a process for managing the operation of a telecom system in accordance with an embodiment of the invention. According to the embodiment, the process comprises determining a rate constraint and a telecom environment condition (S2701) and providing predetermined working points per discrete set of telecom environment condition (S2703). The process may further include determining the predetermined working points. Then, a working point is selected from the predetermined working points (S2705), and the telecom system is operated at the selected working point (S2707). Prior to the selection of the working point, the process may further include loading and adapting the predetermined working points.

What is claimed is:

1. A method of managing the operation of a telecom system according to telecom environment conditions at run-time, the telecom system communicating across one or more particular channels and comprising at least two of an application layer, a middleware layer, a transport layer, a network layer, a data link layer, and a physical layer, the method comprising:
   accessing a plurality of configuration points that have been determined with a simulation framework using an optimization method applied across at least two layers of the telecom system for simulated telecom environments, wherein the simulation framework is separate from said telecom system;
   determining a rate constraint at run-time;
   determining a set of selectable configuration points from the plurality of configuration points based on the rate constraint;
   determining one or more telecom environment conditions of the propagation channel being used in the telecom environment at run-time based on channel state information of the particular channels;
   selecting a configuration point from the set of selectable configuration points, wherein the selected configuration point is selected based on said telecom environment conditions, wherein said plurality of predetermined configuration points are given for a discrete set of telecom environment conditions; and
   operating said telecom system at said selected configuration point by setting control parameters corresponding to said selected configuration point, wherein the telecommunication subsystem continues to communicate across the particular channels.

2. The method of claim 1, wherein said telecom system is a single telecom device.

3. The method of claim 1, wherein said telecom system is a plurality of telecom devices.

4. The method of claim 3, wherein operating said telecom system comprises setting control parameters corresponding to said selected configuration point for each telecom device.

5. The method of claim 3, wherein said telecom environment conditions comprise at least one of path loss and channel frequency selectivity.

6. The method of claim 3, wherein said selecting of a configuration point comprises solving a scheduling problem.

7. The method of claim 6, wherein said scheduling involves scheduling transmission of packets between two or more of said telecom devices, said scheduling taking into account dependencies between packets.

8. The method of claim 1, wherein said plurality of predetermined configuration points define a monotonic, non-convex curve.

9. The method of claim 1, wherein said selecting of a configuration point further comprises selecting the plurality of predetermined configuration points corresponding to the determined telecom environment conditions.

10. The method of claim 1, wherein before said selecting of a configuration point, the method further comprises determining said plurality of predetermined configuration points.

11. The method of claim 1, wherein the telecom environment conditions comprise path loss, channel frequency selectivity, or current traffic requirements.

12. The method of claim 1, wherein after loading, the method further comprises adapting said plurality of configuration points.

13. The method of claim 1, wherein said predetermined set of configuration points comprises a sleep mode and a working mode of said telecom device.

14. The method of claim 1, wherein said rate constraint is a constraint on an average rate.

15. The method of claim 1, wherein said telecom system is a wireless telecom system.

16. The method of claim 1, wherein the rate constraint is passed from one layer to another.

17. The method of claim 1, wherein said control parameters comprise one or more parameters selected from the group consisting of controlling modulation order, code rate, transmit power and packet size.

18. The method of claim 1, wherein said telecom environment conditions comprise a channel state.

19. The method of claim 18, wherein one or more performance-energy trade-off curves are derived for each of said channel states.

20. The method of claim 19, wherein the energy-per-bit is used as an energy metric in the performance-energy trade-off curves.

21. The method of claim 19, wherein net throughput is used as a performance metric in the performance-energy trade-off curves.

22. The method of claim 18, wherein a sum of energy consumption of said telecom devices is used as an energy metric in the performance-energy trade-off curves.

23. The method of claim 19, wherein said performance-energy trade-off curves are Pareto-optimal curves.

24. The method of claim 1, wherein said telecom environment conditions comprise current traffic requirements, and wherein said current traffic requirements is taken into account in determining said rate constraint.

25. The method of claim 1, wherein said rate constraint is a varying rate constraint.

26. The method of claim 1, wherein said selecting is performed by solving an optimization problem.

27. The method of claim 1, wherein said discrete set of telecom environment conditions is organized per channel state.

28. A telecommunication device, configured to perform the method of claim 1, wherein said selecting comprises solving an optimization problem.

29. The device of claim 28, further comprising a processing mechanism configured to solve said optimization problem, or determine or adapt said predetermined configuration points.

30. The method of claim 1, wherein the simulated telecom environments include simulated channel conditions.

31. A telecommunication device, comprising a memory for storing said performance/energy trade-off curves, the device configured to perform the method of claim 1.

32. A method of managing the operation of a telecom system according to telecom environment conditions at run-time, the telecom system communicating across a propagation channel and comprising a queuing mechanism introducing a queuing delay, the telecom system further comprising at least two of an application layer, a middleware layer, a transport layer, a network layer, a data link layer, and a physical layer said method comprising:
  accessing a plurality of control parameters that have been determined with a simulation framework using an optimization method applied across at least two layers of the telecom system for simulated telecom environments, wherein the simulation framework is separate from said telecom system;
  determining one or more conditions of the propagation channel being used in the telecom environment at run-time based on channel state information of the propagation channel, the one or more conditions comprising current traffic requirements;
  determining an average rate constraint to meet said current traffic requirements by solving an optimization problem and selecting at least one control parameter, said control parameter taking into account the instantaneous queuing delay, wherein the optimization problem is bounded by the average rate constraint, and wherein the at least one control parameter is selected from the plurality of control parameters; and
  operating said telecom system by setting said control parameter taking into account the instantaneous queuing delay, wherein the telecommunication subsystem continues to communicate across the propagation channel.

33. The method of claim 32, wherein determining said average rate constraint is based on a look-ahead with a variable window size of link utilization, said window size being determined by said selected control parameter.

34. A telecommunication device, comprising storage means for storing said performance/energy trade-off curves, the device configured to perform the method of claim 32.

35. The method of claim 32, wherein said telecom device is further provided with a packet retransmission mechanism and whereby said optimization problem optimizes the end-to-end throughput.

36. The method of claim 32, wherein said average rate constraint is set as a parameterizable function of the number of bits in the queue of said queuing mechanism.

37. The method of claim 36, wherein the parameterizable function comprises the following equation:

$$\overline{R}_i = K \times \Delta_i$$

wherein $\overline{R}_i$ denotes an average rate constraint;
wherein $\Delta_i$ denotes an average delay;
wherein i denotes a time index; and
wherein K is a proportionality factor.

38. The method of claim 32, wherein the average rate constraint is passed from one layer to another.

39. The method of claim 32, wherein the control parameters comprise one of controlling modulation order, code rate, transmit power, or packet size.

40. The method of claim 32, wherein the simulated telecom environments include simulated channel conditions.

41. A non-transitory computer readable medium storing a program configured to execute a method of managing the operation of a telecom communicating across a propagation channel system according to telecom environment conditions at run-time, the telecom system comprising a queuing mechanism introducing a queuing delay, the telecom system further comprising at least two of an application layer, a middleware layer, a transport layer, a network layer, a data link layer, and a physical layer, said method comprising:
  accessing a plurality of control parameters that have been determined with a simulation framework using an optimization method applied across at least two layers of the telecom system for simulated telecom environments, wherein the simulation framework is separate from said telecom system;

determining one or more conditions of the propagation channel being used in the telecom environment at run-time based on channel state information of the propagation channel, the one or more conditions comprising current traffic requirements;

determining an average rate constraint to meet said current traffic requirements by solving an optimization problem and selecting at least one control parameter, said control parameter taking into account the instantaneous queuing delay, wherein the optimization problem is bounded by the average rate constraint, and wherein the at least one control parameter is selected from the plurality of control parameters; and operating said telecom system by setting said control parameter taking into account the instantaneous queuing delay, wherein the telecommunication subsystem continues to communicate across the particular channels.

42. The computer readable medium of claim 38, wherein the method further comprises passing the average rate constraint from one layer to another.

43. The computer readable medium of claim 41, wherein the control parameters comprise one of controlling modulation order, code rate, transmit power, or packet size.

44. The computer readable medium of claim 41, wherein the conditions comprise path loss, channel frequency selectivity, or current traffic requirements.

45. The computer readable medium of claim 41, wherein the simulated telecom environments include simulated channel conditions.

46. A non-transitory computer readable medium storing a program configured to execute a method of operating a telecom system according to telecom environment conditions at run-time, the telecom system communicating across a propagation channel and comprising at least two of an application layer, a middleware layer, a transport layer, a network layer, a data link layer, and a physical layer, the method comprising:

accessing a plurality of configuration points that have been determined with a simulation framework using an optimization method applied across at least two layers of the telecom system for simulated telecom environments, wherein the simulation framework is separate from said telecom system;

determining a rate constraint at run-time;

determining a set of selectable configuration points from the plurality of configuration points based on the rate constraint;

determining one or more conditions of the propagation channel being used in the telecom environment at run-time based on channel state information of the propagation channel;

selecting a configuration point from the set of selectable configuration points, wherein the selected configuration point is selected based on said telecom environment conditions; and operating said telecom system at said selected configuration point by setting control parameters corresponding to said selected configuration point, wherein the telecommunication subsystem continues to communicate across the propagation channel.

47. The computer readable medium of claim 46, wherein the conditions comprise path loss, channel frequency selectivity, or current traffic requirements.

48. The computer readable medium of claim 46, wherein the method further comprises passing the rate constraint from one layer to another.

49. The computer readable medium of claim 46, wherein each configuration point is related to a set of control parameters of the telecom system.

50. The computer readable medium of claim 49, wherein each of the control parameters comprise one of controlling modulation order, code rate, transmit power, or packet size.

51. The computer readable medium of claim 46, wherein the simulated telecom environments include simulated channel conditions.

\* \* \* \* \*

UNITED STATES PATENT AND TRADEMARK OFFICE
CERTIFICATE OF CORRECTION

| | |
|---|---|
| PATENT NO. | : 8,228,952 B2 |
| APPLICATION NO. | : 10/922371 |
| DATED | : July 24, 2012 |
| INVENTOR(S) | : Sofie Pollin et al. |

It is certified that error appears in the above-identified patent and that said Letters Patent is hereby corrected as shown below:

At Item 56, Title Page 2, Column 1, Line 41, Under Other Publications, change "Los Anglese," to --Los Angeles,--.

In the Drawings

At Sheet 22 of 22 (Reference Numeral No. S2703), Line 2, Change "CONDIDION" to --CONDITION--.

In the Specifications

At Column 8, Line 8, Change "(BIER)," to --(BlER),--.

At Column 8, Line 10, Change "BIER" to --BlER--.

At Column 8, Line 17, Change "BIER" to --BlER--.

At Column 8, Line 20, Change "BIER" to --BlER--.

At Column 8, Line 40, Change "EDSP" to --$E_{DSP}$--.

At Column 7-8 (Table 2), Line 7 (Approx.), Change "Implemtation" to --Implementation--.

At Column 7-8 (Table 2), Line 10 (Approx.), Change "prop agation" to --propagation--.

At Column 9-10 (Table 2), Line 6 (Approx.), Change "BIER" to --BlER--.

At Column 9-10 (Approx.) (Table 2), Line 6 (Approx.), Change "(i/bit)" to --(J/bit)--.

At Column 9-10 (Table 2), Line 10 (Approx.), Change "BIER)" to --BlER)--.

At Column 11, Line 48, Change "(?w)" to --($\Delta$w)--.

At Column 12, Line 57, Change "?i" to --$\Delta$i--.

At Column 13, Line 13, Change "FIGS. 9A-9I," to --FIGS. 9A-9K,--.

At Column 15, Line 18, Change "DLC." to --DLC--.

At Column 16, Line 24, Change "backoff" to --back-off--.

At Column 16, Line 41, Change "A. J" to --A. J.--.

At Column 16, Line 50 (Approx.), Change "ωj" to --ψj--.

Signed and Sealed this
Thirtieth Day of April, 2013

Teresa Stanek Rea
*Acting Director of the United States Patent and Trademark Office*

At Column 17, Line 48 (Approx.), Change "$\forall j = \hat{j}$" to --$\forall j \neq \hat{j}$--.

At Column 21, Line 27, Change "flows'" to --flows--.

At Column 21, Line 58, Change "R1." to --Rl.--.

At Column 22, Line 6, Change "O(n. log L)" to --O(n.log L)--.

At Column 25, Line 3, Change "cast" to --case--.

At Column 26, Line 67, Change "grater" to --greater--.

In the Claims

At Column 29, Line 35, In Claim 22, change "claim 18," to --claim 19,--.

At Column 31, Line 22 (Approx.), In Claim 42, change "claim 38," to --claim 41,--.